United States Patent
Rakib et al.

(10) Patent No.: US 9,722,741 B1
(45) Date of Patent: Aug. 1, 2017

(54) MULTIPLE ACCESS IN WIRELESS TELECOMMUNICATIONS SYSTEM FOR HIGH-MOBILITY APPLICATIONS

(71) Applicant: Cohere Technologies, Inc., Santa Clara, CA (US)

(72) Inventors: Shlomo Rakib, Saratoga, CA (US); Ron Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/215,007

(22) Filed: Jul. 20, 2016

Related U.S. Application Data

(60) Provisional application No. 62/316,243, filed on Mar. 31, 2016, provisional application No. 62/316,298, filed on Mar. 31, 2016.

(51) Int. Cl.
| | | |
|---|---|---|
| *H04L 5/26* | (2006.01) | |
| *H04L 5/00* | (2006.01) | |
| *H04L 27/04* | (2006.01) | |
| *H04J 11/00* | (2006.01) | |
| *H04B 15/00* | (2006.01) | |
| *H04L 27/06* | (2006.01) | |

(52) U.S. Cl.
CPC .......... *H04L 5/0014* (2013.01); *H04J 11/003* (2013.01); *H04L 5/0023* (2013.01); *H04L 27/04* (2013.01); *H04B 15/00* (2013.01); *H04L 27/06* (2013.01)

(58) Field of Classification Search
CPC ....... H04L 27/04; H04L 27/06; H04L 5/0014; H04L 5/0023; H04B 15/00; H04J 11/003
See application file for complete search history.

(56) References Cited

U.S. PATENT DOCUMENTS

| | | | |
|---|---|---|---|
| 7,773,685 B2 | 8/2010 | Tirkkonen et al. | |
| 7,864,877 B2 | 1/2011 | Hottinen | |
| 8,619,892 B2 | 12/2013 | Vetter et al. | |
| 2006/0008021 A1 | 1/2006 | Bonnet | |
| 2007/0104283 A1 | 5/2007 | Han et al. | |
| 2013/0058390 A1 | 3/2013 | Haas et al. | |
| 2014/0348252 A1 | 11/2014 | Siohan et al. | |
| 2015/0080725 A1* | 3/2015 | Wegner | A61B 8/14 600/440 |
| 2016/0157146 A1* | 6/2016 | Karabinis | H04W 12/02 370/334 |

OTHER PUBLICATIONS

R. Hadani et al., "Orthogonal Time Frequency Space Modulation," 2017 IEEE Wireless Communications and Networking Conference (WCNC), San Francisco, CA, USA, 2017, pp. 1-6.*
Mazzaro et al., "Introduction to Stepped-Frequency Radar," US Army RDECOM, Aug. 2013, pp. 1-22, (accessible at http://ece.citadel.edu/mazzaro/particip/SFR_Intro_Mazzaro.pdf, last accessed May 22, 2017).*

* cited by examiner

*Primary Examiner* — Michelle M Koeth
(74) *Attorney, Agent, or Firm* — McGeary Cukor LLC; Jason Paul DeMont; Kenneth Ottesen

(57) ABSTRACT

A wireless telecommunications system that mitigates infra-symbol interference due to Doppler-shift and multipath and enables multiple access in one radio channel. Embodiments of the present invention are particularly advantageous for wireless telecommunications systems that operate in high-mobility environments, including high-speed trains and airplanes.

30 Claims, 20 Drawing Sheets

Figure 14

Figure 15C
Waveforms in Waveform Array Φ
Partitioned Between Wireless Terminal 130-1, Wireless Terminal 130-2, and Guard Waveforms
| φ(1,1) | φ(2,1) | φ(3,1) | ... | φ(M-2,1) | φ(M-1,1) | φ(M,1) |
|---|---|---|---|---|---|---|
| φ(1,2) | φ(2,2) | φ(3,2) | ... | φ(M-2,2) | φ(M-1,2) | φ(M,2) |
| ... | ... | ... | ... | ... | ... | ... |
| φ(1,N-1) | φ(2,N-1) | φ(3,N-1) | ... | φ(M-2,N-1) | φ(M-1,N-1) | φ(M,N-1) |
| φ(1,N) | φ(2,N) | φ(3,N) | ... | φ(M-2,N) | φ(M-1,N) | φ(M,N) |
 Waveform Assigned As Guard Waveform
 Waveform Assigned To Wireless Terminal 130-2
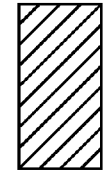 Waveform Assigned To Wireless Terminal 130-1

MULTIPLE ACCESS IN WIRELESS TELECOMMUNICATIONS SYSTEM FOR HIGH-MOBILITY APPLICATIONS

STATEMENT OF RELATED APPLICATIONS

This application claims benefit to provisional application No. 62/316,243, filed on 31 Mar. 2016, entitled "Robust Wireless Telecommunications System,".

This application claims benefit to provisional application No. 62/316,298, filed on 31 Mar. 2016, entitled "Orthogonal Time Frequency Space,".

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take steps to address the impairments, and in some cases the receiver addresses the impairments. In all cases, however, the nature of each impairment must be detected quickly and accurately so that it can be mitigated.

SUMMARY OF THE INVENTION

The present invention is a wireless telecommunications system that avoids some of the costs and disadvantages of wireless telecommunications systems in the prior art. In particular, the illustrative embodiment of the present invention is able to discriminate between direct-path and multi-path images, which (substantially) prevents infrasymbol interference and enables the remediation of intersymbol interference. Embodiments of the present invention are particularly advantageous in radio channels with multi-path and Doppler-shift impairments.

Furthermore, embodiments of the present invention enable a plurality of transmitters to simultaneously transmit (radiate) into the same radio channel to a single receiver in such a way that the receiver can separate the individual transmissions and properly associate them with their respective transmitters. This is widely called "multiple access" and is well known in other telecommunications systems (e.g., frequency-division multiple access, time-division multiple access, code-division multiple-access, etc.).

BRIEF DESCRIPTION OF THE DRAWINGS

FIG. 14 depicts the waveforms of waveform array $\Phi$ can be represented in tabular form.

FIGS. 15A, 15B, and 15C depict three alternative partitions of the waveforms in waveform array $\Phi$ such that each waveform $\phi(m,n)$ is assigned to wireless terminal 130-1, wireless terminal 130-2, or to neither (i.e., to be reserved as a guard waveform).

DETAILED DESCRIPTION

Figure 1A:
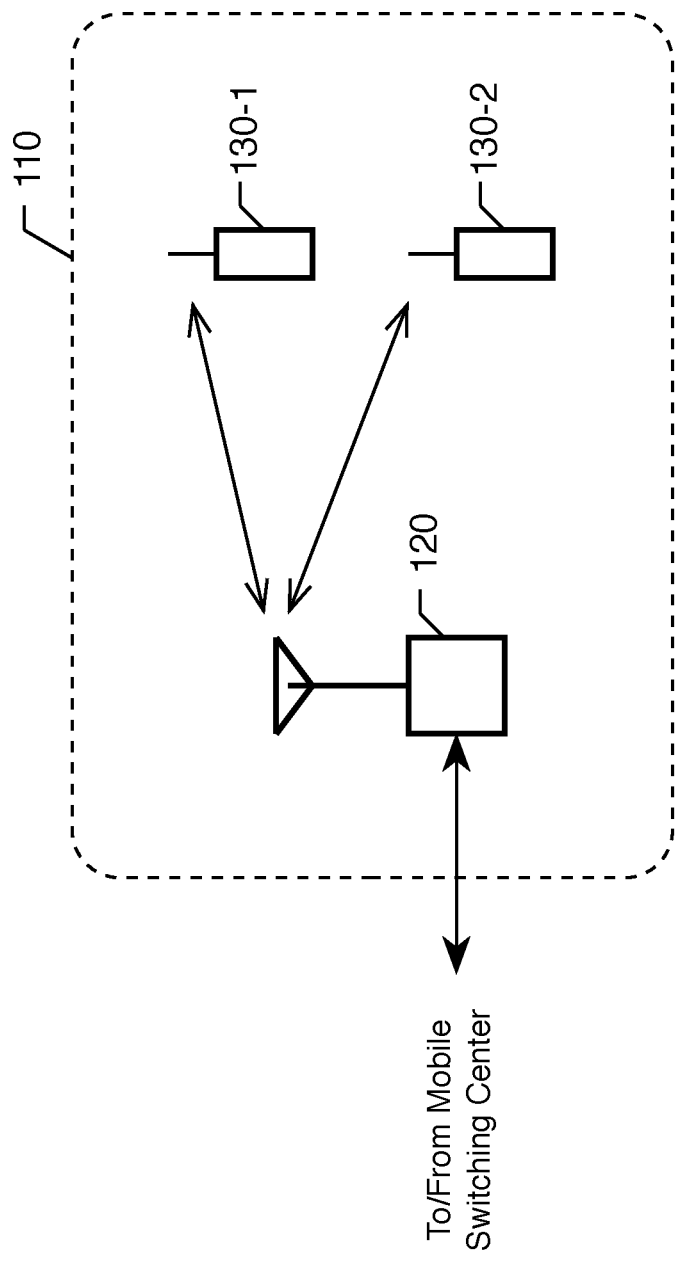
FIG. 1A depicts a block diagram of the salient components of wireless telecommunications system 100 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises: base station 120, wireless terminal 130-1, and wireless terminal 130-2, all of which are situated in geographic region 110.

In accordance with the illustrative embodiment, base station 120 provides bi-directional wireless telecommunications service to wireless terminal 130-1 and wireless terminal 130-2.

In accordance with the illustrative embodiment, base station 120 provides telecommunications service by exchanging "data items" with wireless terminal 130-1 and wireless terminal 130-2, which data items represent sound, images, video, data, and signaling. It will be clear to those skilled in the art how to make and use base station 120, wireless terminal 130, and wireless terminal 130-2 so that they can de-construct sound, images, video, data, and signaling into data items, and it will be clear to those skilled in the art how to make and use base station 120, wireless terminal 130, and wireless terminal 130-2 so that they can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises one base station and two wireless terminals, but it will be clear to those skilled in the art, after reading this disclosure, how to make and use alternative embodiments of the present invention that comprise any number of base stations and any number of wireless terminals. Furthermore, it will be clear to those skilled in the art how to partition the radio spectrum in an area into radio channels and to assign those channels to the base stations.

In accordance with the illustrative embodiment, base station 120 is stationary and terrestrial, but it will be clear to those skilled in the art, after reading this disclosure, how to make and use alternative embodiments of the present invention in which each base station 120 is mobile or airborne, or mobile and airborne.

In accordance with the illustrative embodiment, wireless terminal 130-1 and wireless terminal 130-2 are mobile, but it will be clear to those skilled in the art, after reading this disclosure, how to make and use alternative embodiments of the present invention in which each wireless terminal is either mobile or stationary.

In accordance with the illustrative embodiment, geographic region 110 comprises natural and man-made radio-frequency objects (not shown) that reflect, refract, and diffract the carrier signals that propagate between base station 120 and wireless terminal 130-1 and wireless terminal 130-2. Furthermore, some of the radio-frequency objects are stationary (e.g., trees, hills, buildings, etc.) and some are mobile (e.g., trucks, ships, airplanes, etc.).

In accordance with the illustrative embodiment, the parameters that characterize the signal-path impairments in the radio channel between base station 120 and wireless terminal 130-1 and wireless terminal 130-2 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, base station 120 and wireless terminal 130-1 and wireless terminal 130-2 exchange modulated radio-frequency carrier signals in a radio channel that is B=10 MHz wide. It will be clear to those skilled in the art, however, after reading this disclosure, how to make and use alternative embodiments of the present invention in which the radio channel has a different bandwidth (e.g., 2.5 MHz, 5.0 MHz, 12.5 MHz, 15 MHz, 20 MHz, 40 MHz, 80 MHz, etc.).

Figure 1B:
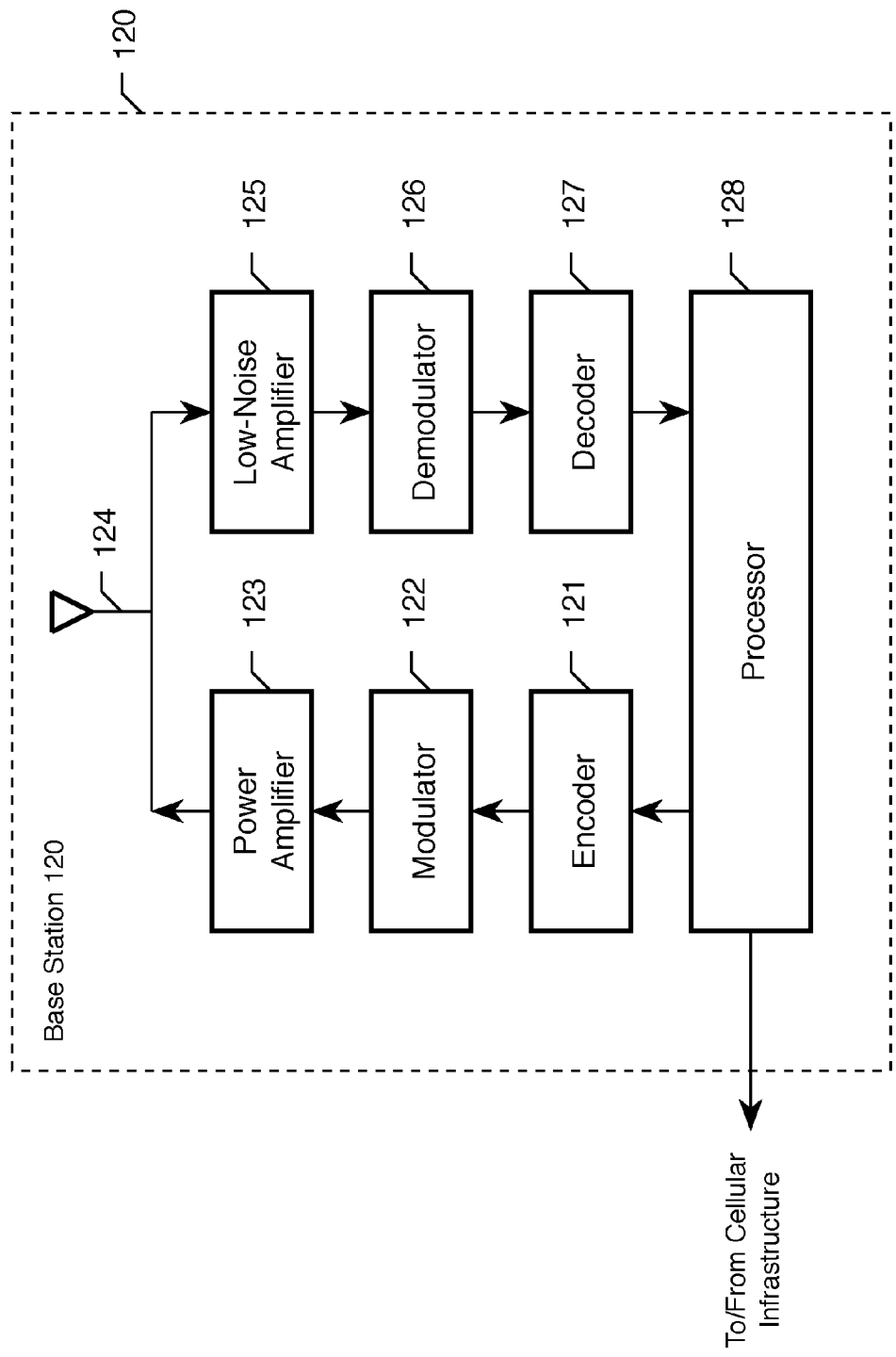
FIG. 1B depicts a block diagram of the salient components of base station 120 in accordance with the illustrative embodiment of the present invention.

FIG. 1B depicts a block diagram of the salient components of base station 120 in accordance with the illustrative embodiment of the present invention. Base station 120 comprises: encoder 121, modulator 122, power amplifier 123, and antenna 124, low-noise amplifier 125, demodulator 126, decoder 127, and processor 128.

Encoder 121 comprises the hardware and software necessary to compress, encrypt, and add forward error correction to the data items to be transmitted to wireless terminal 130-1 and wireless terminal 130-2. It will be clear to those skilled in the art how to make and use encoder 121.

Modulator 122 comprises the hardware and software necessary to modulate a radio-frequency carrier signal with the data items from encoder 121 to generate a modulated radio-frequency carrier signal. The construction and operation of modulator 122 is described in detail herein and in the accompanying figures.

Power amplifier 123 comprises the hardware necessary to increase the power of the modulated radio-frequency carrier signal for transmission via antenna 124. It will be clear to those skilled in the art how to make and use power amplifier 123.

Antenna 124 comprises the hardware necessary to facilitate the radiation of the modulated radio-frequency carrier signal wirelessly through space to wireless terminal 130-1 and wireless terminal 130-2. It will be clear to those skilled in the art how to make and use antenna 124.

Low-Noise amplifier 125 comprises the hardware necessary to increase the power of the modulated radio-frequency carrier signal received via antenna 124. It will be clear to those skilled in the art how to make and use low-noise amplifier 125.

Demodulator 126 comprises the hardware and software necessary to:
i. demodulate the modulated radio-frequency carrier signal received by antenna 124, which is the sum of a first modulated radio-frequency carrier signal transmitted by wireless terminal 130-1 and a second modulated radio-frequency carrier signal transmitted by wireless terminal 130-2, and
ii. recover one or more data items transmitted by wireless terminal 130-1 that are embodied in the modulated radio-frequency carrier signal and to associate those data items with wireless terminal 130-1, and
iii. recover one or more data items transmitted by wireless terminal 130-2 that are embodied in the modulated radio-frequency carrier signal and to associate those data items with wireless terminal 130-2.

It will be clear to those skilled in the art, after reading this disclosure, how to make and use demodulator 126.

Decoder 127 comprises the hardware and software necessary to decompress, decrypt, and correct the data items transmitted by wireless terminal 130-1 and wireless terminal 130-2. It will be clear to those skilled in the art how to make and use decoder 127.

Processor 128 comprises the hardware and software necessary to operate base station 120 and to interface with the cellular infrastructure (not shown in FIG. 1B). It will be clear to those skilled in the art, after reading this disclosure, how to make and use processor 128.

Figure 1C:
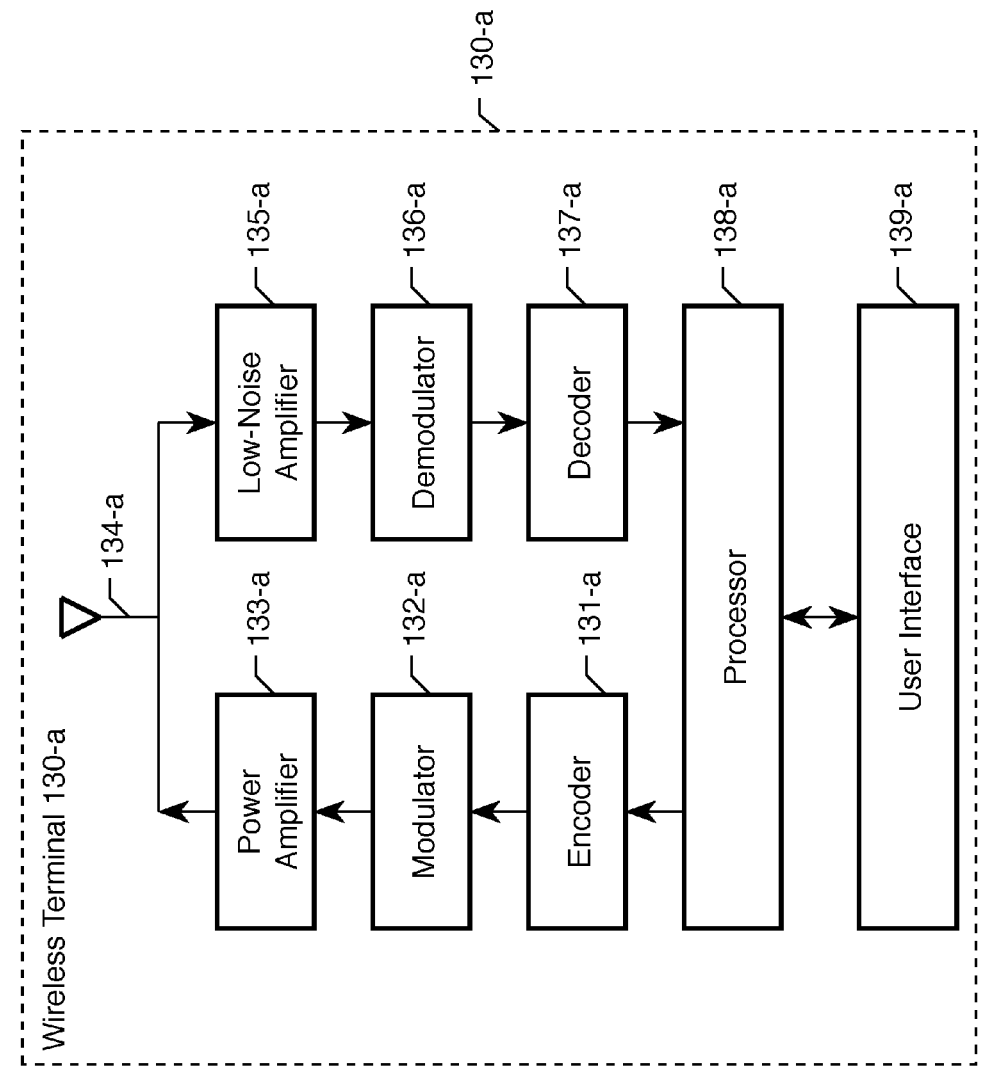
FIG. 1C depicts a block diagram of the salient components of wireless terminal 130-1 in accordance with the illustrative embodiment of the present invention.

FIG. 1C depicts a block diagram of the salient components of wireless terminal 130-$a$, wherein $a \in \{1, 2\}$, in accordance with the illustrative embodiment of the present invention. Wireless terminal 130-$a$ comprises: encoder 131-$a$, modulator 132-$a$, power amplifier 133-$a$, and antenna 134-$a$, low-noise amplifier 135-$a$, demodulator 136-$a$, decoder 137-$a$, processor 138-$a$, and user interface 139-$a$.

Encoder 131-$a$ comprises the hardware and software necessary to compress, encrypt, and add forward error correction to the data items to be transmitted to base station 120. It will be clear to those skilled in the art how to make and use encoder 131-*a*.

Modulator 132-*a* comprises the hardware and software necessary to modulate a radio-frequency carrier signal with the data items from encoder 131-*a* to generate a modulated radio-frequency carrier signal. The construction and operation of modulator 132-*a* is described in detail herein and in the accompanying figures.

Power amplifier 133-*a* comprises the hardware necessary to increase the power of the modulated radio-frequency carrier signal for transmission via antenna 134-*a*. It will be clear to those skilled in the art how to make and use power amplifier 133-*a*.

Antenna 134-*a* comprises the hardware necessary to facilitate the radiation of the modulated radio-frequency carrier signal wirelessly through space to base station 120. It will be clear to those skilled in the art how to make and use antenna 134-*a*.

Low-Noise amplifier 135-*a* comprises the hardware necessary to increase the power of the modulated radio-frequency carrier signals received via antenna 134-*a*. It will be clear to those skilled in the art how to make and use low-noise amplifier 135-*a*.

Demodulator 136-*a* comprises the hardware and software necessary to demodulate a modulated radio-frequency carrier signal transmitted by base station 120 to recover the data items transmitted by base station 120. It will be clear to those skilled in the art, after reading this disclosure, how to make and use demodulator 136-*a*.

Decoder 137-*a* comprises the hardware and software necessary to decompress, decrypt, and correct the data items transmitted by base station 120. It will be clear to those skilled in the art how to make and use decoder 137-*a*.

Processor 138-*a* comprises the hardware and software necessary to operate wireless terminal 130-*a* and to interface with user interface 139-*a*. It will be clear to those skilled in the art, after reading this disclosure, how to make and use processor 138-*a*.

User interface 139-*a* comprises the hardware and software necessary to enable a user (not shown) to interact with wireless terminal 130-*a*. It will be clear to those skilled in the art how to make and use user interface 139-*a*.

Figure 2:
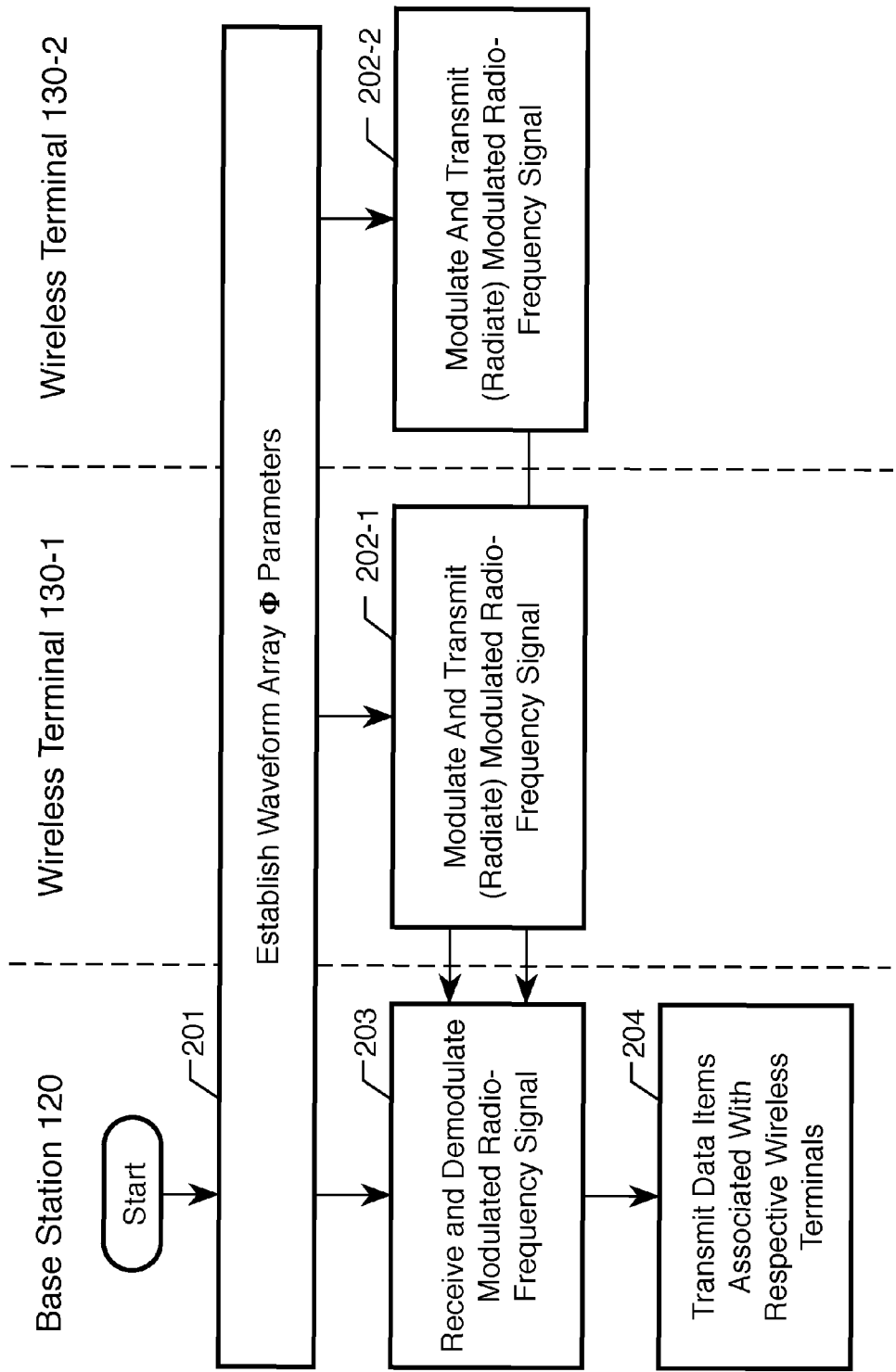
FIG. 2 depicts a flowchart of the salient tasks performed by base station 120, wireless terminal 130-1, and wireless terminal 130-2 in accordance with the illustrative embodiment of the present invention.

FIG. 2 depicts a flowchart of the salient tasks performed by base station 120, wireless terminal 130-1, and wireless terminal 130-2 in accordance with the illustrative embodiment of the present invention.

At task 201, base station 120, wireless terminal 130-1, and wireless terminal 130-2 establish the parameters of waveform array $\Phi$ with which they will communicate. Task 201 is described in detail below and in the accompanying figures.

At task 202, wireless terminal 130-1 and wireless terminal 130-2 each transmit (radiate) a modulated radio-frequency signal in a radio channel to base station 120 in accordance with the parameters of waveform array $\Phi$ established in task 201. Task 202 is described in detail below and in the accompanying figures.

At task 203, base station 120 receives a modulated radio-frequency signal from the radio channel that is a sum of the modulated radio-frequency signals (and their respective multipath images, if any) radiated by wireless terminal 130-1 and wireless terminal 130-2. As part of task 203, base station 120 demodulates and decodes the modulated radio-frequency signal to recover one or more data items transmitted by wireless terminal 130-1 (and to associate those data items with wireless terminal 130-1) and one or more data items transmitted by wireless terminal 130-2 (and to associate those data items with wireless terminal 130-2). It will be clear to those skilled in the art, after reading this disclosure, how to make base station 120 to be able to perform task 203.

At task 204, base station 120 transmits one or more data items associated with wireless terminal 130-1 and one or more data items associated with wireless terminal 130-2 to the cellular infrastructure (e.g., a mobile switching center, etc.), which is not shown in FIG. 1B.

Figure 13:
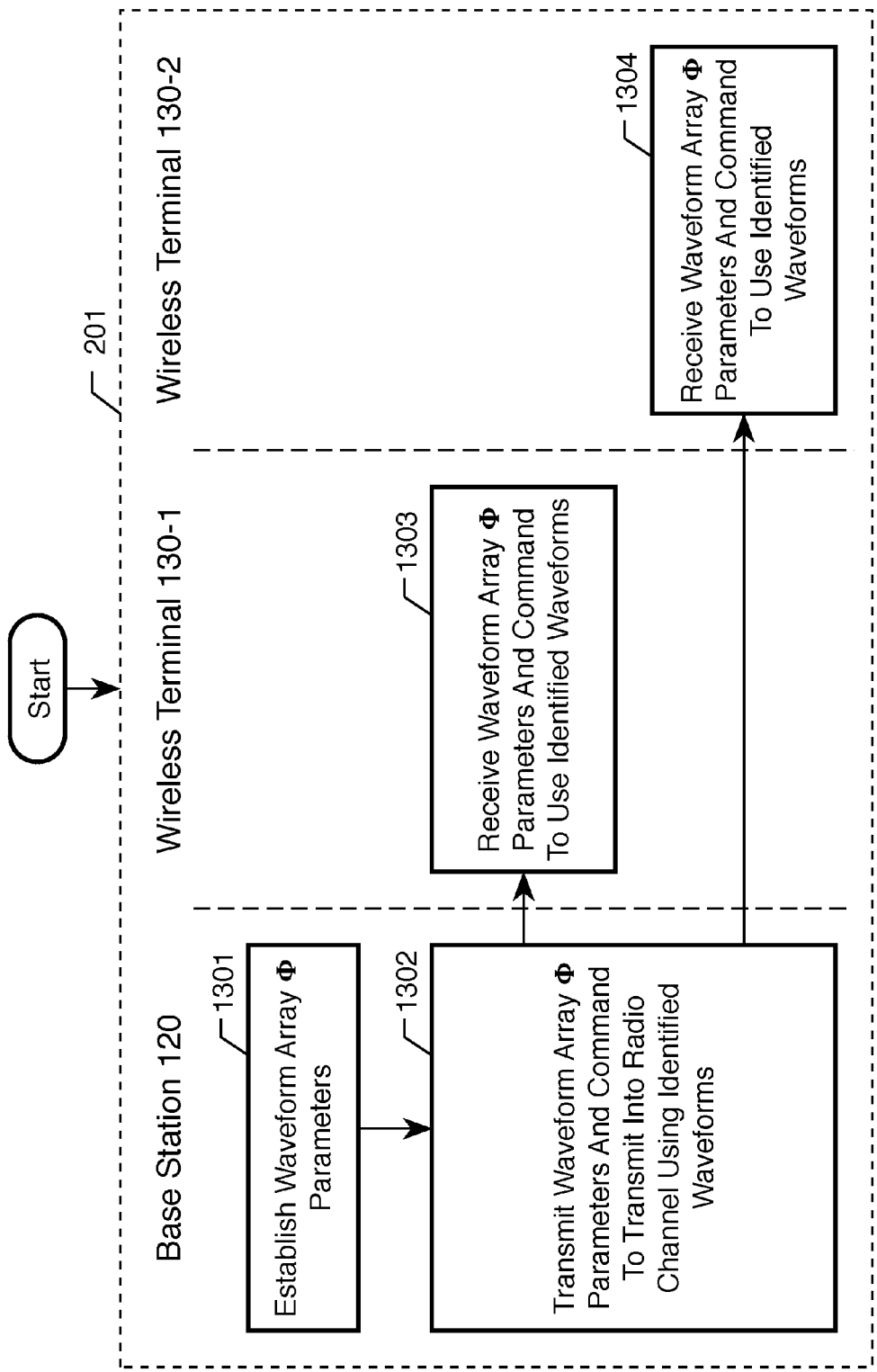
FIG. 13 depicts a flowchart of the salient tasks performed by base station 120, wireless terminal 130-1, and wireless terminal 130-2 in accordance with the performance of task 201.

FIG. 13 depicts a flowchart of the salient tasks performed by base station 120, wireless terminal 130-1, and wireless terminal 130-2 in the performance of task 201. As part of task 120, the parameters of waveform array $\Phi$ are chosen to both:
  i. mitigate infra-symbol interference caused by Doppler-shift and multipath interference, and
  ii. enable simultaneous multiple access by both wireless terminal 130-1 and wireless terminal 130-2 to base station 120.

At task 1301, the parameters of waveform array $\Phi$ are established once, before the time when base station 120, wireless terminal 130-1, and wireless terminal 130-2 first establish communication, but it will be clear to those skilled in the art, after reading this disclosure, how to make and use alternative embodiments of the present invention in which the radios periodically or sporadically re-establish the parameters of waveform array $\Phi$. For example and without limitation, base station 120, wireless terminal 130-1, and wireless terminal 130-2 can re-establish the parameters of waveform array $\Phi$ as:
  i. traits of the signal path from change, or
  ii. the type of data represented by the data items changes, or
  iii. the latency tolerance of the data items changes, or
  iv. any combination of i, ii, and iii.

In accordance with the illustrative embodiment, base station 120, wireless terminal 130-1, and wireless terminal 130-2 convey data items using one waveform array $\Phi$, but it will be clear to those skilled in the art, after reading this disclosure, how to make and use alternative embodiments of the present invention that use any number of waveform arrays (e.g., two waveform arrays $\Phi 1$ and $\Phi 2$; three waveform arrays, $\Phi 1$, $\Phi 2$, and $\Phi 3$; four waveform arrays, $\Phi 1$, $\Phi 2$, $\Phi 3$, and $\Phi 4$; etc.) to convey data items. For example and without limitation, base station 120, wireless terminal 130-1, and wireless terminal 130-2 use different waveform arrays for:
  i. different conditions of the signal path between base station 120 and wireless terminal 130-1 and wireless terminal 130-2, or
  ii. different types of data items, or
  iii. different latency tolerance of the data items, or
  iv. any combination of i, ii, and iii.

Basic Waveforms—

Waveform array $\Phi$ is based on an extension of M basic waveforms $b(1), \ldots, b(m), \ldots, b(M)$ that are orthogonal in M-dimensional vector space, where M is a positive integer greater than 1, and m is a positive integer in the range $m \in \{1, \ldots, M\}$.

Figure 3:
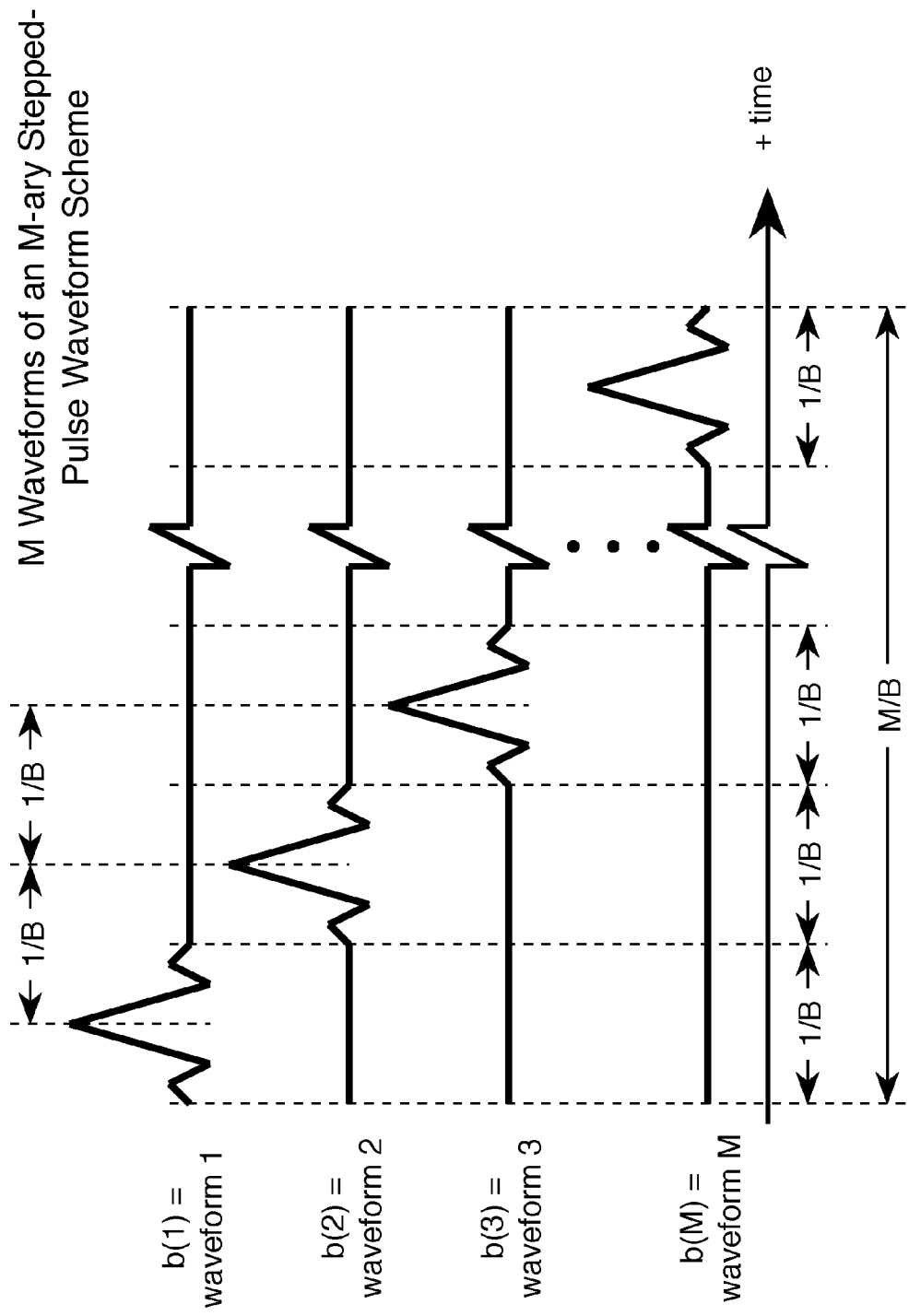
FIG. 3 depicts a waveform array $\Phi$ is based on M orthogonal M-ary stepped-pulse waveforms.

In accordance with the illustrative embodiment, basic waveform $b(m)$ is a waveform m of a M-ary stepped-pulse waveform scheme, as depicted in FIG. 3. In accordance with the illustrative embodiment, each pulse is a band-limited raised-cosine pulse but it will be clear to those skilled in the art, after reading this disclosure, how to make and use alternative embodiments of the present invention in which each pulse has a different shape.

Each pulse in basic waveform b(m) is band-limited, and, therefore, the duration of each pulse is 1/B seconds, wherein B is the bandwidth of the channel. Furthermore, the centers of adjacent pulses are separated by 1/B seconds. And still furthermore, the total duration of each basic waveform b(m) is M/B seconds (as depicted in FIG. 3).

Although the illustrative embodiment uses stepped-pulse waveforms as the basic waveforms, it will be clear to those skilled in the art, however, after reading this disclosure, how to make and use alternative embodiments of the present invention in which waveform array Φ is based on any set of M orthogonal waveforms, b(1), . . . , b(M).

Structure of Waveform Array Φ—

Waveform array Φ comprises M·N waveforms that are orthogonal in M·N-dimensional vector space, wherein N is a positive integer greater than 1. The M·N waveforms of waveform array Φ are φ(1,1), . . . , φ(m,n), . . . , φ(M,N), where n is a positive integer in the range n∈{1, . . . , N}.

Each waveform φ(m,n) is identically partitioned into N time slots 1, . . . , p, . . . , N, where p is a positive integer in the range p∈{1, . . . , N}.

Each waveform φ(m,n) is the sum of N waveforms y(m,n,1), . . . , y(m,n,p), . . . , y(m,n,N). Waveform y(m,n,p) occupies time slot p in waveform φ(m,p) and equals:

$$y(m,n,p)=b(m)\cdot u(n,p) \quad (Eq. 1)$$

wherein u(n,p) is a phasor that equals:

$$u(n,p)=\exp(2\pi(n-1)(p-1)i/N) \quad (Eq. 2)$$

The duration of waveform y(m,n,p) defines the duration of time slot p.

Figure 4:
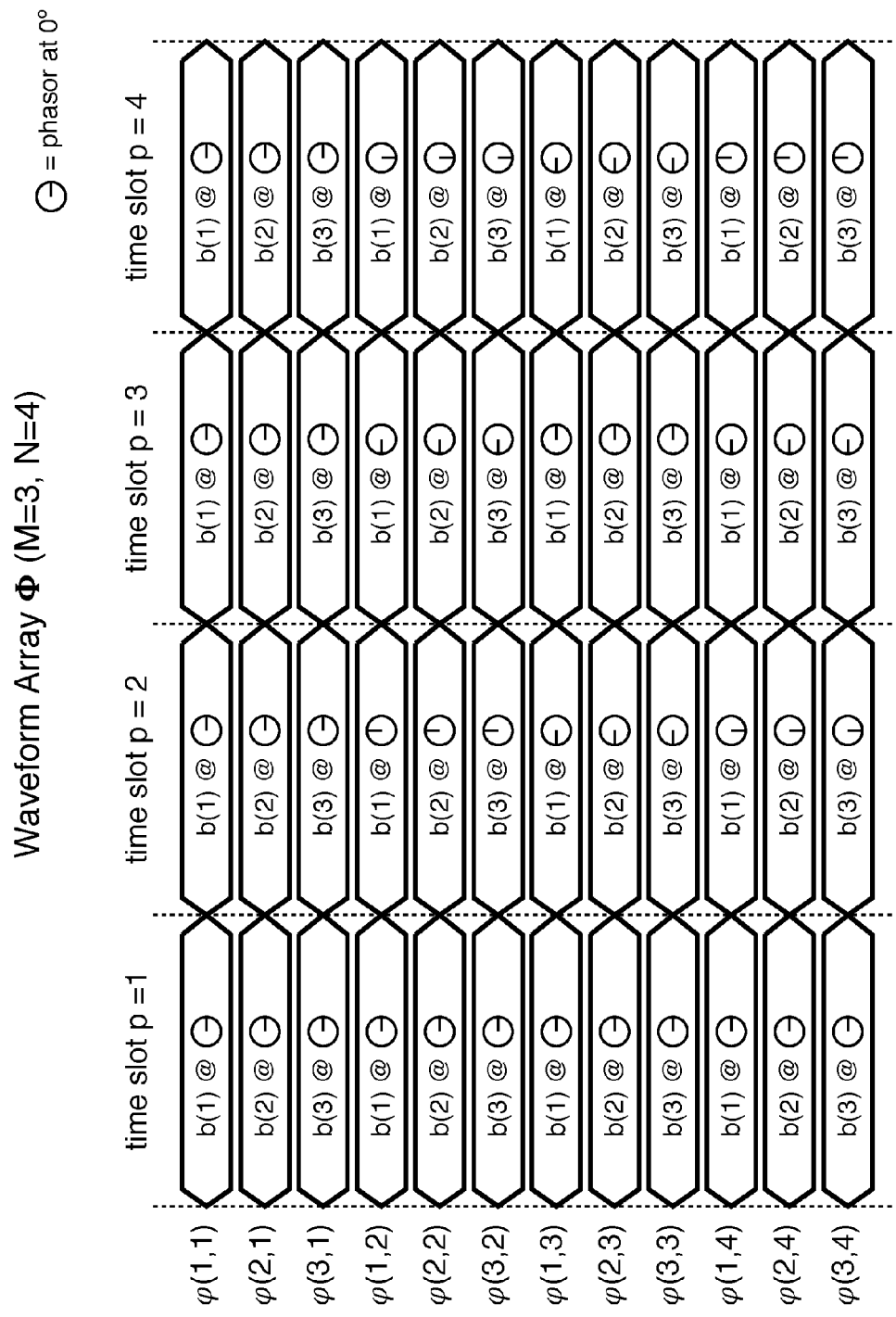
FIG. 4 depicts the composition of waveform array $\Phi$ (M=3 and N=4) for any set of orthogonal basic waveforms.
Figure 5:
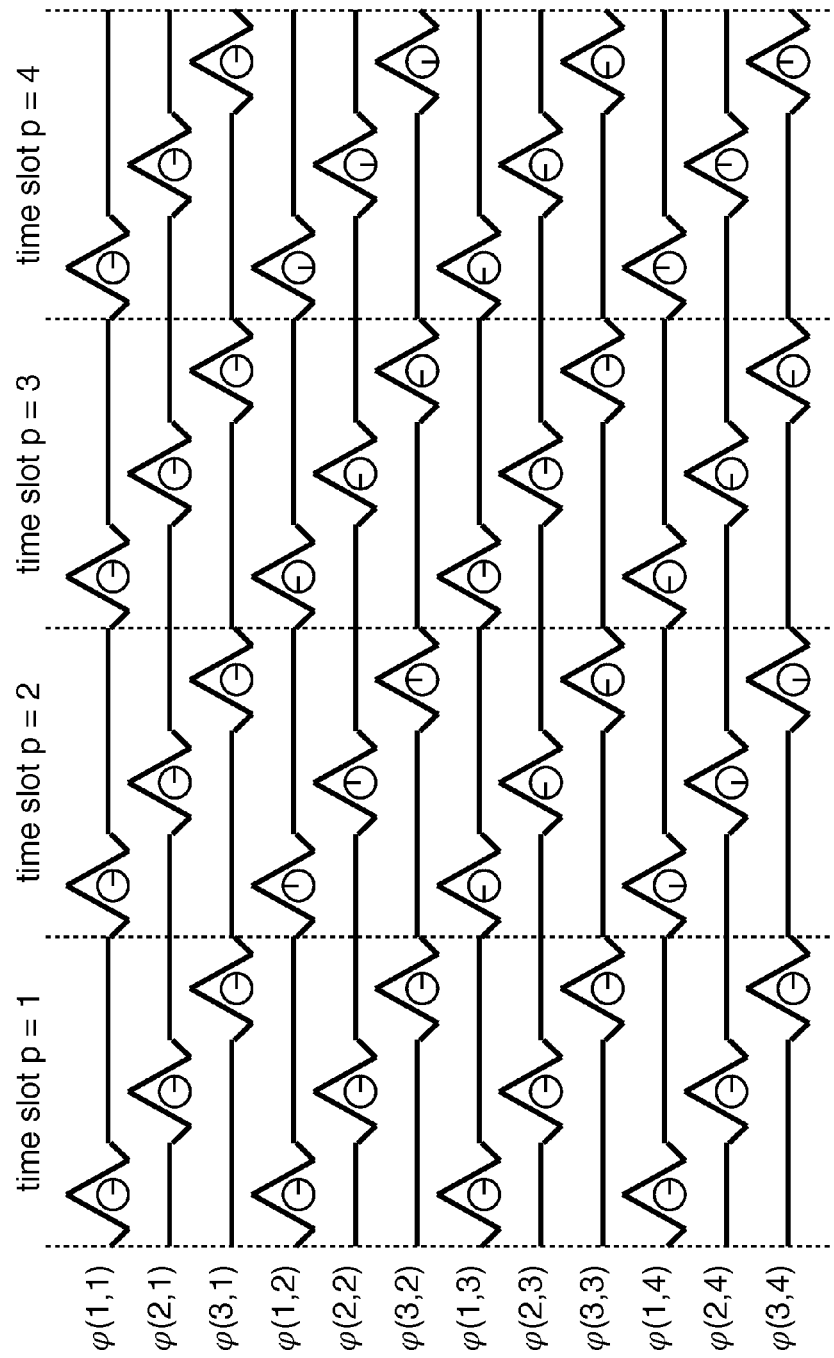
FIG. 5 depicts the composition of waveform array $\Phi$ (M=3 and N=4) for the stepped-pulse waveform.

An illustrative waveform array Φ (M=3 and N=4) is depicted in FIG. 4 and FIG. 5, and the phasors u(n,p) associated with the array are depicted in Table 1.

TABLE 1

Phasors u(n, p) for Each Waveform y(m, n, p) in Waveform Array Φ (M = 3 and N = 4)

| | time slot p = 1 | time slot p = 2 | time slot p = 3 | time slot p = 4 |
|---|---|---|---|---|
| y(m, 1, p) | 1 + 0i | 1 + 0i | 1 + 0i | 1 + 0i |
| y(m, 2, p) | 1 + 0i | 0 + 1i | −1 + 0i | 0 − 1i |
| y(m, 3, p) | 1 + 0i | −1 + 0i | 1 + 0i | −1 + 0i |
| y(m, 4, p) | 1 + 0i | 0 − 1i | −1 + 0i | 0 + 1i |

A salient characteristic of the illustrative embodiment is that each waveform φ(m,n) deposits energy into:
 i. unique time-frequency portions the radio channel, and
 ii. 1/M·N$^{th}$ of the radio channel.
This is illustrated in FIGS. 6 and 7.

Figure 6:
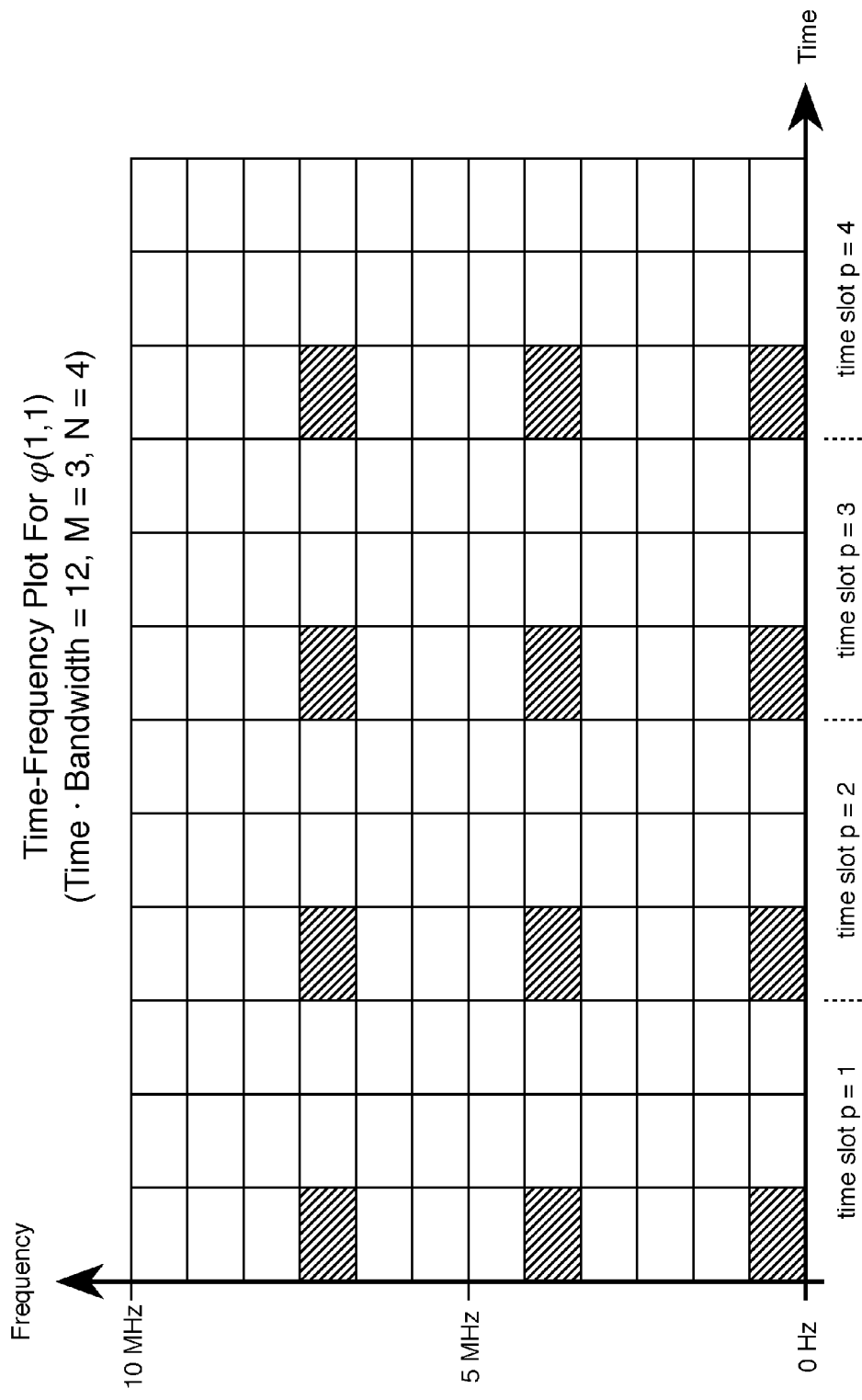
FIG. 6 depicts a time-frequency plot for one of the waveforms—waveform $\phi(1,1)$—in the illustrative waveform array $\Phi$ (M=3 and N=4).

For example, FIG. 6 depicts a plot of where the energy associated with waveform φ(1,1) of waveform array Φ (M=3 and N=4) is deposited into the 10 MHz radio channel. In FIG. 6 the radio channel depicted is divided into twelve 833.3 KHz frequency bands (B=10 MHz/M·N=12) and twelve (M·N=12) intervals. In FIG. 6, it can be seen that energy exists only in those intervals when the raised-cosine pulse exists and only in the frequency sub-bands 0-0.833 MHz, 3.333-4.167 MHz, and 6.667-7.500 MHz (i.e., the diagonally-striped blocks) in the channel.

Figure 7:
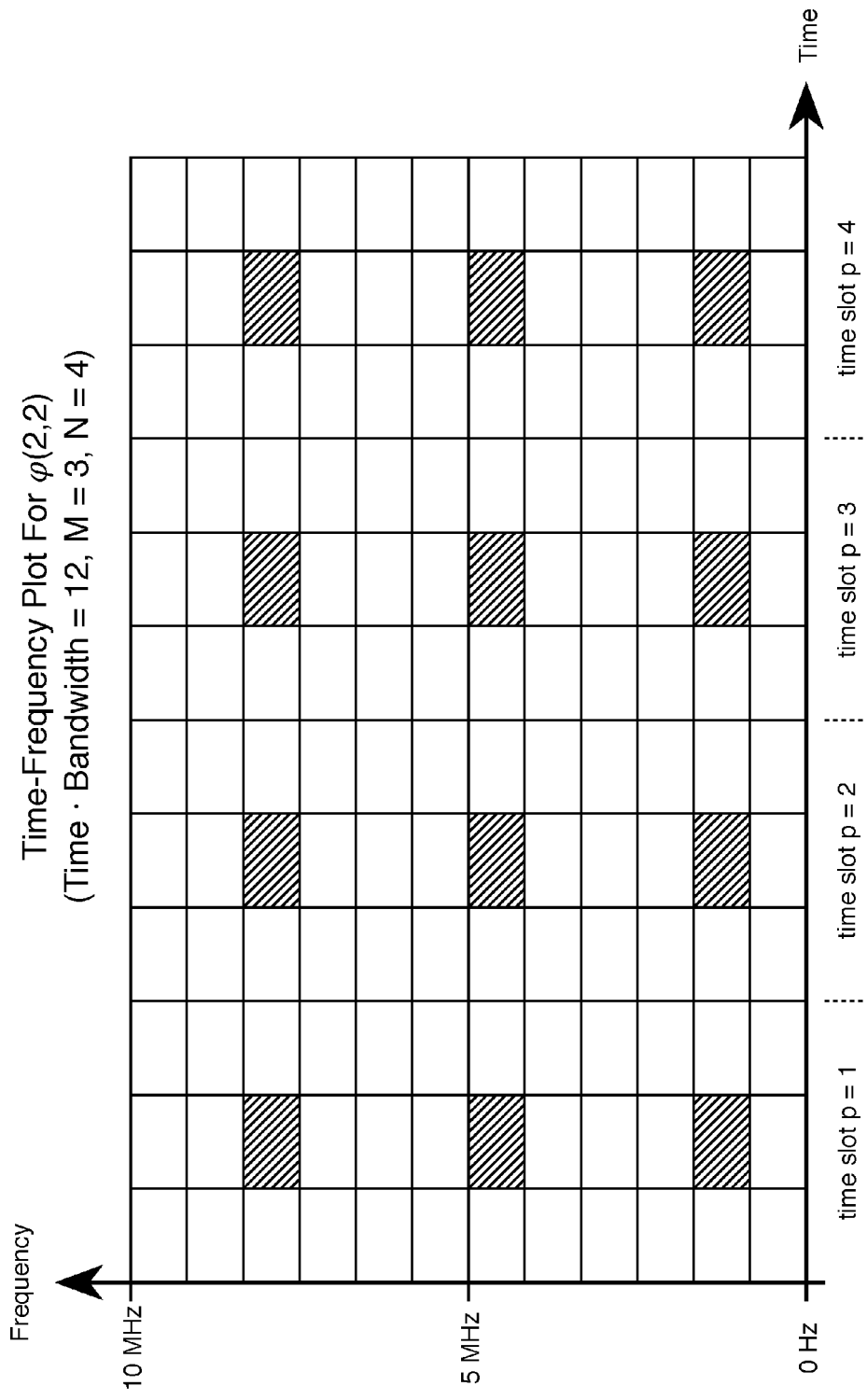
FIG. 7 depicts a time-frequency plot for a different one of the waveforms—waveform $\phi(2,2)$—in the illustrative waveform array $\Phi$ (M=3 and N=4).

Similarly, FIG. 7 depicts a plot of where the energy associated with waveform φ(2,2) of waveform array Φ (M=3 and N=4) is deposited into the 10 MHz radio channel. In FIG. 7, it can be seen that energy exists only in those intervals when the raised-cosine pulse exists and only in the frequency sub-bands 0.833-1.667 MHz, 4.167-5.000 MHz, and 7.500-8.333 MHz (i.e., the diagonally-striped blocks) in the channel. It will be clear to those skilled in the art, after reading this disclosure, how to determine where the energy associated with any waveform φ(m,n) is deposited for an M and N.

Figure 8:
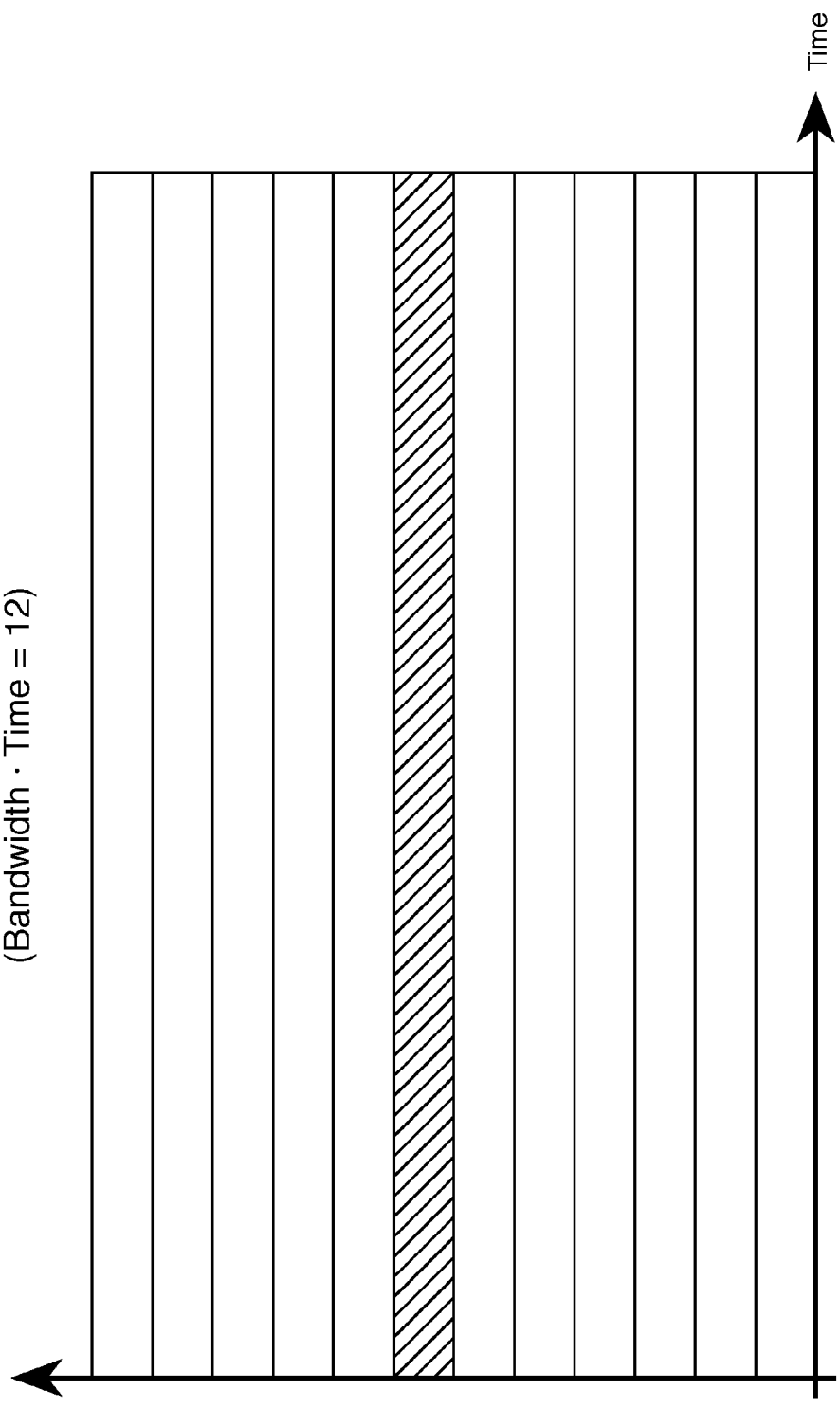
FIG. 8 depicts a time-frequency plot for the transmission of one data item in a frequency-division multiplexed/frequency-division multiple access ("FDM/FDMA") scheme.

For comparison, FIG. 8 depicts an analogous time-frequency plot for the transmission of one data item in a frequency-division multiplexed/frequency-division multiple access ("FDM/FDMA") scheme. In FIG. 8, the striped portion of the time-frequency plot indicates which portion of the channel is occupied by the waveform that transmits the data item.

Figure 9:
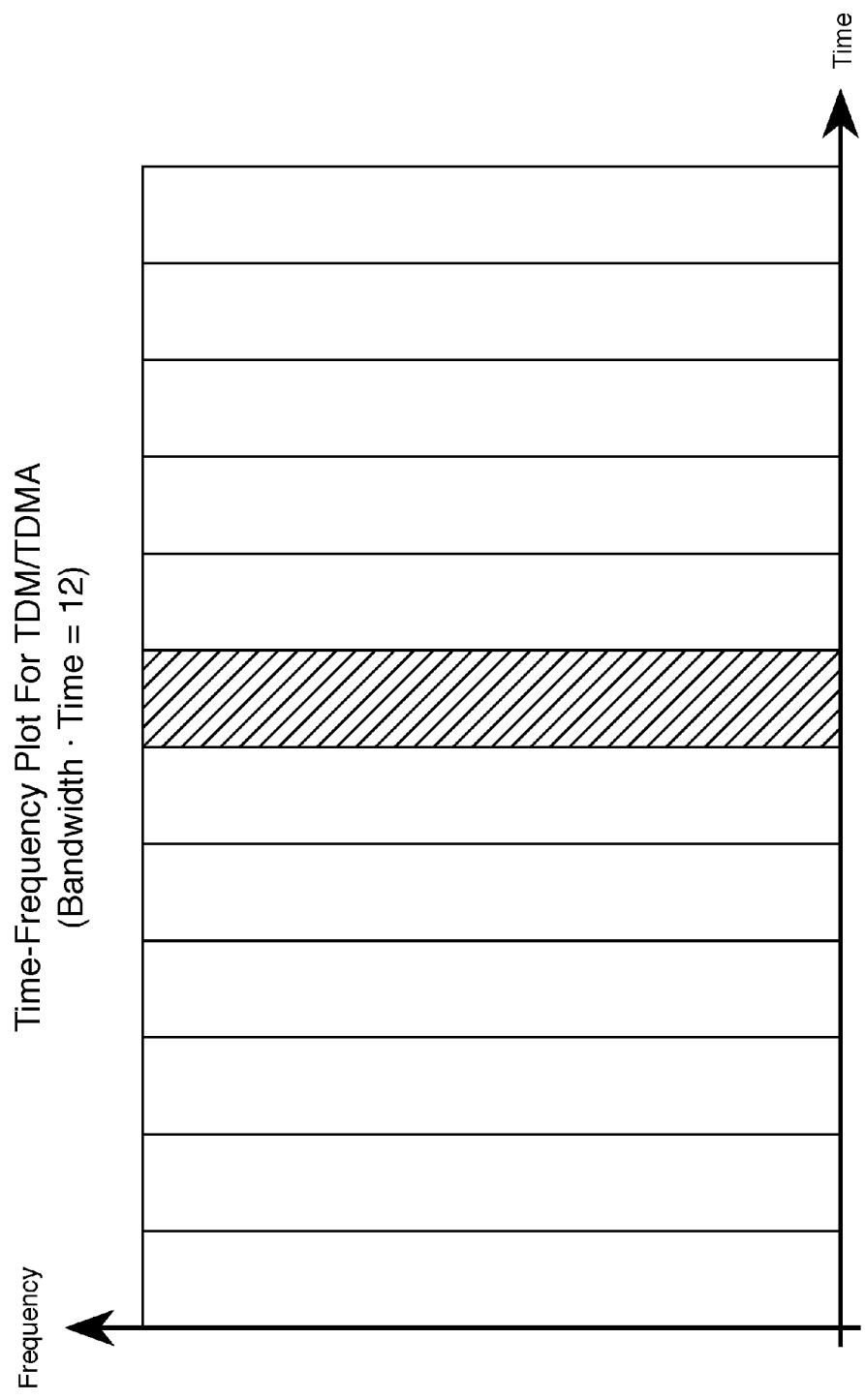
FIG. 9 depicts a time-frequency plot for the transmission of one data item in a time-division multiplexed/time-division multiple access ("TDM/TDMA") scheme.

As another example, FIG. 9 depicts an analogous time-frequency plot for the transmission of one data item in a time-division multiplexed/time-division multiple access ("TDM/TDMA") scheme. In FIG. 9, the striped portion of the time-frequency plot indicates which portion of the channel is occupied by the waveform that transmits the data item.

Figure 10:
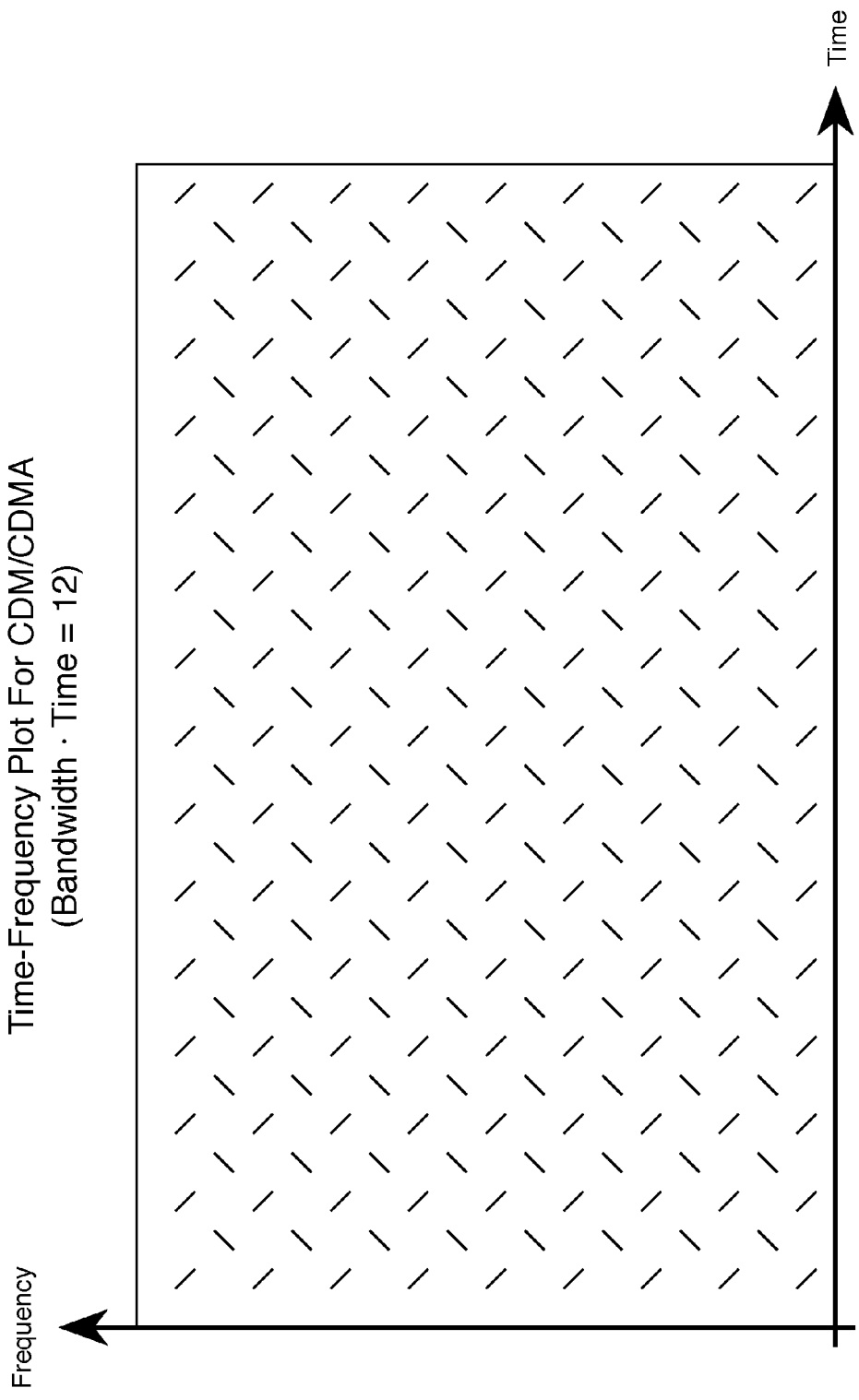
FIG. 10 depicts a time-frequency plot for the transmission of one data item in a code-division multiplexed/code-division multiple access ("CDM/CDMA") scheme.

As another example, FIG. 10 depicts a time-frequency plot for the transmission of one data item in a code-division multiplexed/code-division multiple access ("CDM/CDMA") scheme. In FIG. 10, the entire time-frequency plot is partially striped to indicate that energy is deposited throughout all of the channel all of the time by the waveform that transmits one data item.

Figure 11:
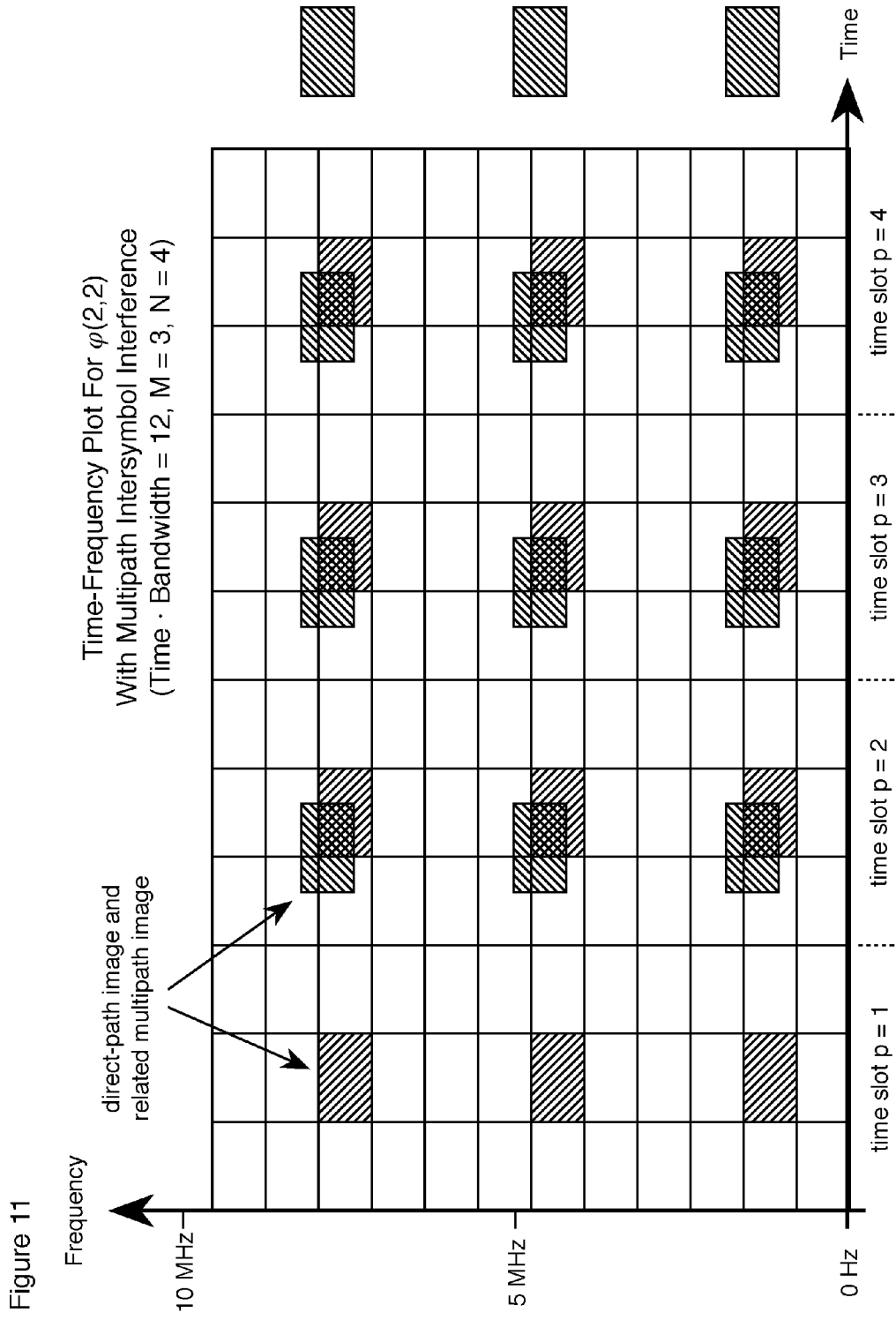
FIG. 11 depicts a time-frequency plot in which a Doppler-shifted multipath image of waveform $\phi(2,2)$ causes infra-symbol interference.

FIG. 11 depicts a plot of where the energy associated with waveform φ(2,2) of waveform array Φ (M=3 and N=4) is received from the 10 MHz radio channel. In particular, FIG. 11 depicts:
 (i) a direct-path image of waveform φ(2,2), and
 (ii) a Doppler-shifted multipath image of waveform φ(2, 2).

From FIG. 11, it can be seen that the Doppler-shifted multipath image partially overlaps—and causes infrasymbol interference to—the direct-path image. Furthermore, the Doppler-shifted multipath image partially overlaps—and causes intersymbol interference to the direct-path images of waveforms φ(1,2), φ(1,3), and φ(3,2). When the receiver can discriminate between the direct-path and multipath images, the infrasymbol interference can be avoided and the intersymbol interference can be eliminated.

Figure 12:
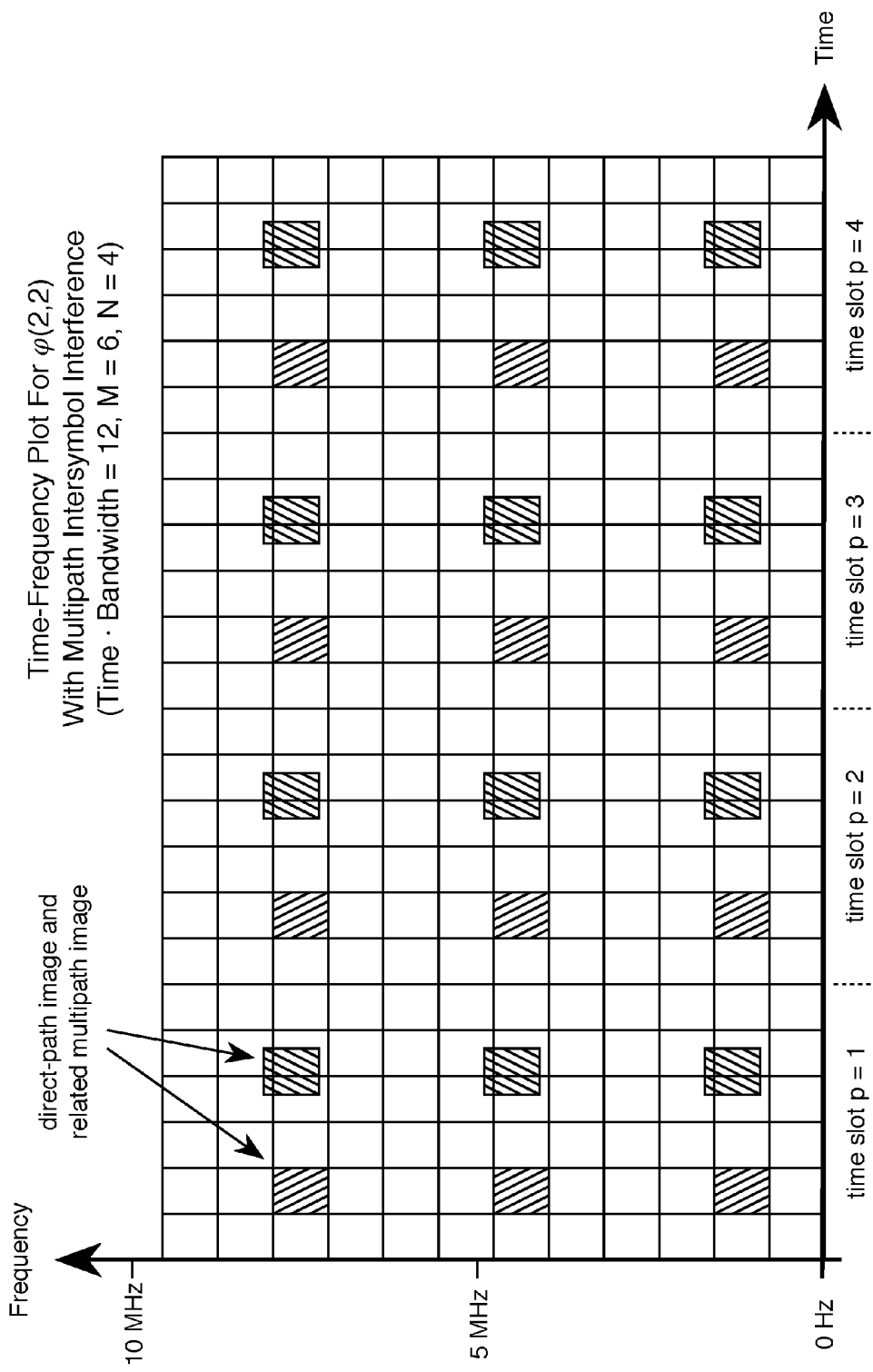
FIG. 12 depicts a time-frequency plot in which a Doppler-shifted multipath image of waveform $\phi(2,2)$ does not cause infra-symbol interference given the same delay spread as in FIG. 11.

In particular, the ability of embodiments of the present invention to discriminate between direct-path and multipath images of waveform φ(m,n) is a function of the values of M and N. In general, larger values of M and N enable higher resolution, and, therefore, greater discrimination between direct-path and multipath images. In particular, larger values of M enable greater discrimination in frequency (i.e., between Doppler-shifted images) and larger values of N enable greater discrimination in time (i.e., between delayed images). As a general rule of thumb, values of M should be much larger than the largest expected delay spread in the radio channel and values of N should be larger than the largest expected Doppler-shift in the radio channel. It will be clear to those skilled in the art, after reading this disclosure, how to make and use alternative embodiments of the present invention with any value of M, any value of N, and a set of M basic waveforms b(1), . . . , b(M). FIG. 12 depicts a time-frequency plot in which a Doppler-shifted multipath image of waveform φ(2,2) does not cause infra-symbol interference given the same delay spread as in FIG. 11.

As part of task 1301, base station 120 assigns:
 i. one or more of the waveforms of waveform array Φ to wireless terminal 130-1 to be used by wireless terminal 130-1 for transmitting data items to base station 120, and ii. one or more of the waveforms of waveform array Φ to wireless terminal 130-2 to be used by wireless terminal 130-2 for transmitting data items to base station 120, and iii. one or more of the waveforms of waveform array Φ as guard waveforms that are not used by either wireless terminal 130-1 or wireless terminal 130-1 and shield the waveforms transmitted by each wireless terminal from interference by waveforms transmitted by another wireless terminal.

Figure 14:
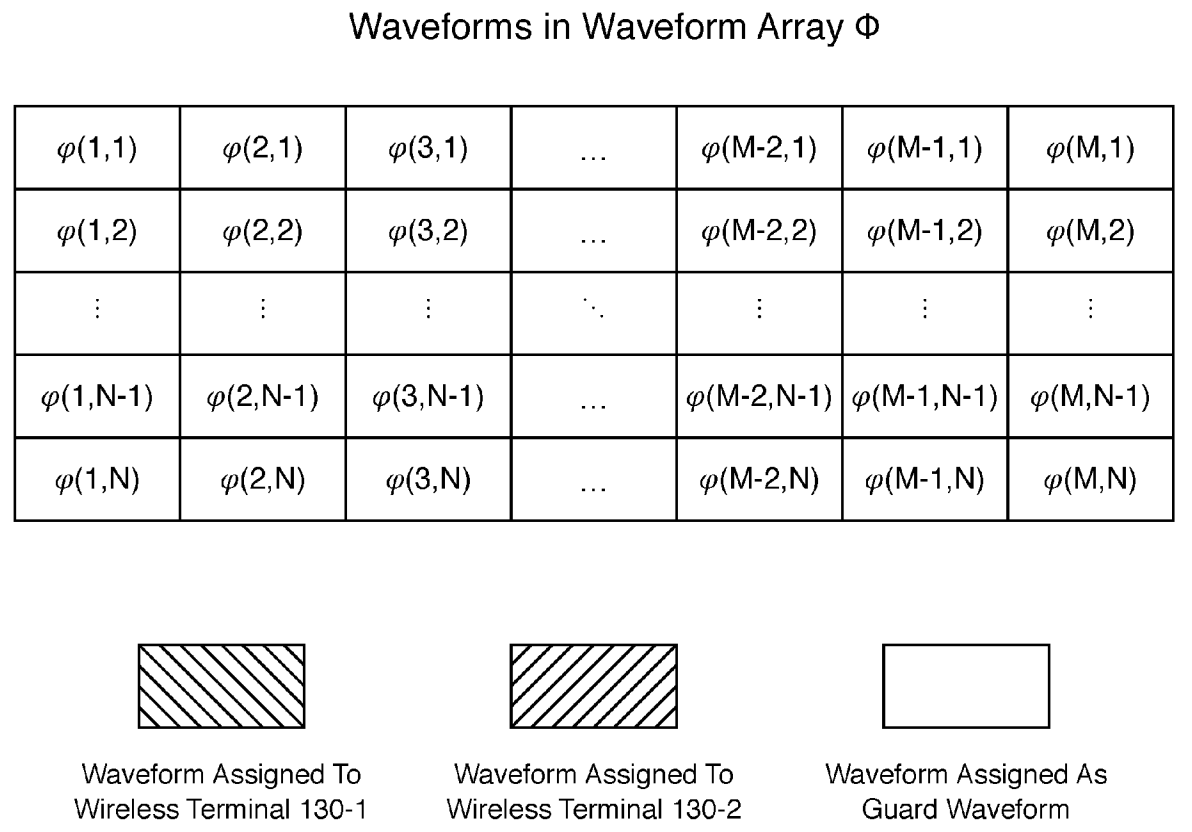

As explained above, each waveform array Φ comprises M·N waveforms that are identified as φ(1,1), . . . , φ(m,n), . . . , φ(M,N). The rectangular nature of waveform array Φ can be represented in tabular form as depicted in FIG. 14.

Figure 15A:
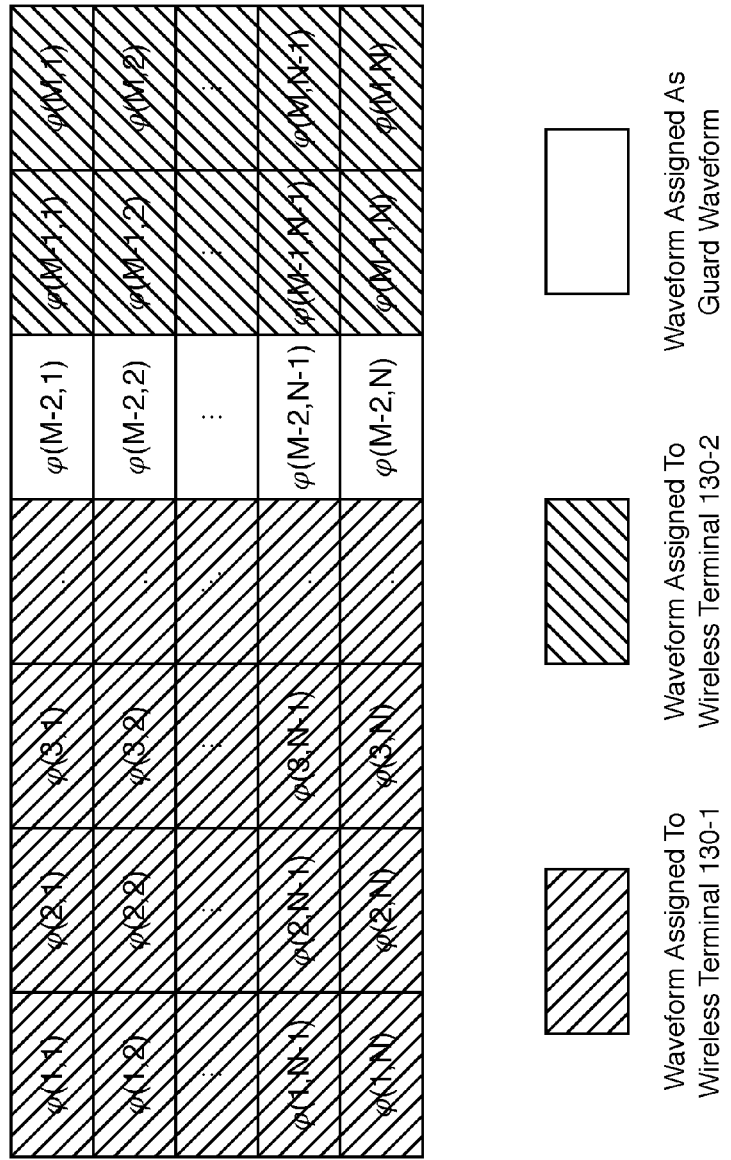
Figure 15B:
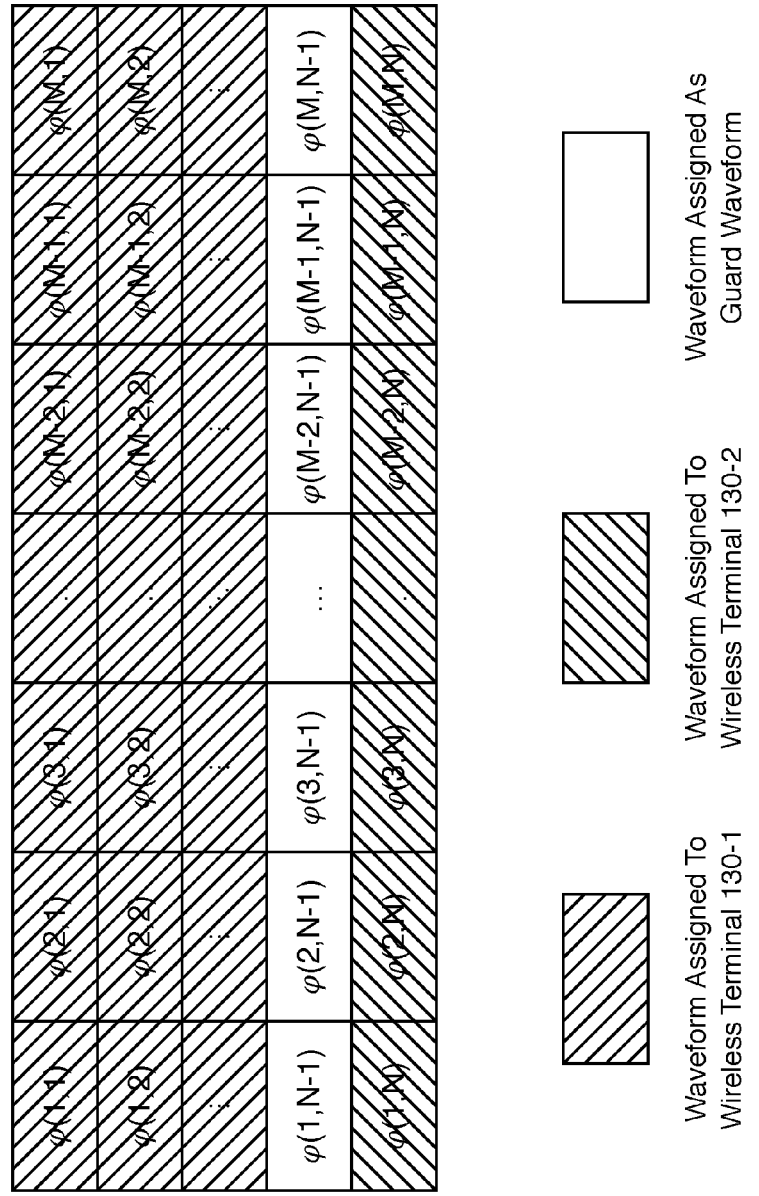

FIGS. 15A, 15B, and 15C depict three alternative partitions of the waveforms in waveform array Φ such that each waveform φ(m,n) is assigned to wireless terminal 130-1, wireless terminal 130-2, or to neither (i.e., to be reserved as a guard waveform).

In FIG. 15A, wireless terminal 130-1 has been assigned waveforms φ(1,1), . . . , φ(M-4,N), wireless terminal 130-2 has been assigned waveforms φ(M-1,1), . . . , φ(M,N), and waveforms φ(M-2,1), . . . , φ(M-2,N) have been reserved as guard waveforms.

In FIG. 15B, wireless terminal 130-1 has been assigned waveforms φ(1,1), . . . , φ(M,N-2), wireless terminal 130-2 has been assigned waveforms φ(1,N), . . . , φ(M,N), and waveforms φ(1,N-1), . . . , φ(M,N-1) have been reserved as guard waveforms.

In FIG. 15C, wireless terminal 130-1 has been assigned waveforms φ(1,1), . . . , φ(1,N) and φ(M-2,1), . . . , φ(M-2,N), wireless terminal 130-2 has been assigned waveforms φ(3,1), . . . , φ(3,N) and φ(M,1), . . . , φ(M,N), and the remainder of the waveforms have been reserved as guard waveforms.

It will be clear to those skilled in the art, after reading this disclosure, how to partition the waveforms in waveform array Φ among any number of wireless terminals and guard waveforms.

At task 1302, base station 120 transmits the waveform array Φ parameters to wireless terminal 130-1 and wireless terminal 130-2 along with a command to transmit into the radio channel using the assigned waveforms.

At task 1303, wireless terminal 130-1 receives the waveform array Φ parameters and the command to use the waveforms assigned to it.

At task 1304, wireless terminal 130-2 receives the waveform array Φ parameters and the command to use the waveforms assigned to it.

Figure 16:
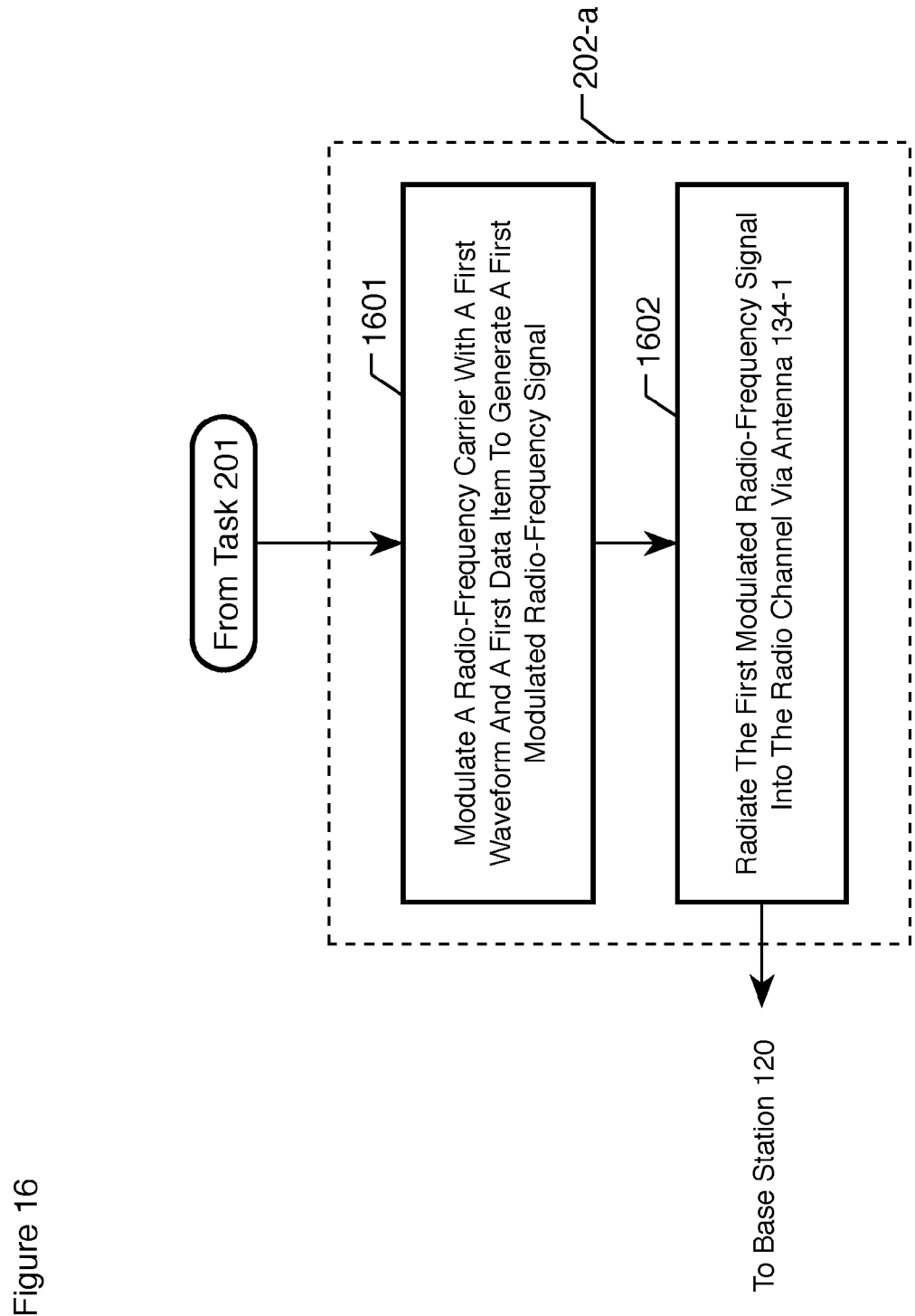
FIG. 16 depicts a flowchart of the salient tasks performed by wireless terminal 130-a in accordance with the performance of task 202-a.

FIG. 16 depicts a flowchart of the salient tasks associated with task 202-a, wherein a∈{1, 2}, in accordance with the illustrative embodiment of the present invention.

At task 1601, wireless terminal 130-a establishes a one-to-one relationship between each data item it will transmit to base station 120 and each waveform φ(m,n) in waveform array Φ that has been assigned to it. As part of task 1601, wireless terminal 130-a modulates a radio-frequency carrier signal with each waveform assigned to it and the corresponding data item to generate a modulated radio-frequency carrier signal. It will be clear to those skilled in the art, after reading this disclosure, how to make and use embodiments of the present invention that perform task 1601.

At task 1602, the modulated radio-frequency carrier signal is radiated into the radio channel via antenna 134-a for reception by base station 120. It will be clear to those skilled in the art, after reading this disclosure, how to make and use embodiments of the present invention that perform task 1602.

MARKMAN DEFINITIONS

Orthogonal—For the purpose of this specification, two waveforms are orthogonal if their inner product is zero over the time interval of interest.

What is claimed is:
1. A process comprising:
transmitting:
(a) a first command to a first wireless terminal to transmit, into a radio channel during a frame, a first modulated radio-frequency carrier signal that is modulated with a first waveform φ(1,1) and a first data item d(1,1), and
(b) a second command to a second wireless terminal to transmit, into the radio channel during the frame, a second modulated radio-frequency carrier signal that is modulated with a second waveform φ(M,1) and a second data item d(M,1),
wherein:
(i) the waveform φ(m,n) is partitioned into N time slots 1, . . . , p, . . . , N,
(ii) time slot p of the waveform φ(m,n) comprises a basic waveform b(m) multiplied by $\exp[2\pi(n-1)(p-1)i/N]$,
(iii) the first waveform φ(1,1) is multiplied by the first data item d(1,1), and the second waveform φ(M,1) is multiplied by the second data item d(M,1),
(iv) M and N are positive integers greater than 1,
(v) m is a positive integer in the range m∈{1, . . . , M}, and
(vi) n and p are positive integers in the range n∈{1, . . . , N};
receiving, from the radio channel during the frame, a third modulated radio-frequency carrier signal via an antenna;
demodulating the third modulated radio-frequency carrier signal to recover the first data item d(1,1) and the second data item d(M,1); and
transmitting the first data item d(1,1) in association with the first wireless terminal and the second data item d(M,1) in association with the second wireless terminal.

2. The process of claim 1 wherein j and k are positive integers in the range m∈{1, . . . , M}, and
wherein a basic waveform b(j) and a basic waveform b(k) are orthogonal for j≠k.

3. The process of claim 1 wherein the basic waveform b(m) is waveform m in an M-ary stepped-pulse waveform scheme.

4. The process of claim 1 wherein the bandwidth of the radio channel is B Hz, and the duration of the basic waveform b(m) is M/B seconds.

5. The process of claim 1 wherein the bandwidth of the radio channel is B Hz, and the duration of the waveform φ(m,n) is M·N/B seconds.

6. A process comprising:
transmitting:
(a) a first command to a first wireless terminal to transmit, into a radio channel during a frame, a first modulated radio-frequency carrier signal that is modulated with a first waveform φ(1,1) and a first data item d(1,1), and (b) a second command to a second wireless terminal to transmit, into the radio channel during the frame, a second modulated radio-frequency carrier signal that is modulated with a second waveform $\phi(1,N)$ and a second data item $d(1,N)$, wherein:
(i) the waveform $\phi(m,n)$ is partitioned into N time slots 1, ..., p, ..., N,
(ii) time slot p of the waveform $\phi(m,n)$ comprises a basic waveform $b(m)$ multiplied by $\exp[2\pi(n-1)(p-1)i/N]$,
(iii) the first waveform $\phi(1,1)$ is multiplied by the first data item $d(1,1)$, and the second waveform $\phi(1,N)$ is multiplied by the second data item $d(1,N)$,
(iv) M and N are positive integers greater than 1,
(v) m is a positive integer in the range $m\epsilon\{1, ..., M\}$, and
(vi) n and p are positive integers in the range $n\epsilon\{1, ..., N\}$;

receiving, from the radio channel during the frame, a third modulated radio-frequency carrier signal via an antenna;
demodulating the third modulated radio-frequency carrier signal to recover the first data item $d(1,1)$ and the second data item $d(1,N)$; and
transmitting the first data item $d(1,1)$ in association with the first wireless terminal and the second data item $d(1,N)$ in association with the second wireless terminal.

7. The process of claim 6 wherein j and k are positive integers in the range $m\epsilon\{1, ..., M\}$, and
wherein a basic waveform $b(j)$ and a basic waveform $b(k)$ are orthogonal for $j \neq k$.

8. The process of claim 6 wherein the basic waveform $b(m)$ is waveform m in an M-ary stepped-pulse waveform scheme.

9. The process of claim 6 wherein the bandwidth of the radio channel is B Hz, and the duration of the basic waveform $b(m)$ is M/B seconds.

10. The process of claim 6 wherein the bandwidth of the radio channel is B Hz, and the duration of the waveform $\phi(m,n)$ is M·N/B seconds.

11. A process comprising:
transmitting:
(a) a first command to a first wireless terminal to transmit, into a radio channel during a frame, a first modulated radio-frequency carrier signal that is modulated with a first waveform $\phi(1,1)$ and a first data item $d(1,1)$, and
(b) a second command to a second wireless terminal to transmit, into the radio channel during the frame, a second modulated radio-frequency carrier signal that is modulated with a second waveform $\phi(M,N)$ and a second data item $d(M,N)$,
wherein:
(i) the waveform $\phi(m,n)$ is partitioned into N time slots 1, ..., p, ..., N,
(ii) time slot p of the waveform $\phi(m,n)$ comprises a basic waveform $b(m)$ multiplied by $\exp[2\pi(n-1)(p-1)i/N]$,
(iii) the first waveform $\phi(1,1)$ is multiplied by the first data item $d(1,1)$, and the second waveform $\phi(M,N)$ is multiplied by the second data item $d(M,N)$,
(iv) M and N are positive integers greater than 1,
(v) m is a positive integer in the range $m\epsilon\{1, ..., M\}$, and
(vi) n and p are positive integers in the range $n\epsilon\{1, ..., N\}$;

receiving, from the radio channel during the frame, a third modulated radio-frequency carrier signal via an antenna;
demodulating the third modulated radio-frequency carrier signal to recover the first data item $d(1,1)$ and the second data item $d(M,N)$; and
transmitting the first data item $d(1,1)$ in association with the first wireless terminal and the second data item $d(M,N)$ in association with the second wireless terminal.

12. The process of claim 11 wherein j and k are positive integers in the range $m\epsilon\{1, ..., M\}$, and
wherein a basic waveform $b(j)$ and a basic waveform $b(k)$ are orthogonal for $j \neq k$.

13. The process of claim 11 wherein the basic waveform $b(m)$ is waveform m in an M-ary stepped-pulse waveform scheme.

14. The process of claim 11 wherein the bandwidth of the radio channel is B Hz, and the duration of the basic waveform $b(m)$ is M/B seconds.

15. The process of claim 11 wherein the bandwidth of the radio channel is B Hz, and the duration of the waveform $\phi(m,n)$ is M·N/B seconds.

16. A process comprising:
transmitting:
(a) a first command to a first wireless terminal to transmit, into a radio channel during a frame, a first modulated radio-frequency carrier signal that is modulated with a first waveform $\phi(M,1)$ and a first data item $d(M,1)$, and
(b) a second command to a second wireless terminal to transmit, into the radio channel during the frame, a second modulated radio-frequency carrier signal that is modulated with a second waveform $\phi(1,N)$ and a second data item $d(1,N)$,
wherein:
(i) the waveform $\phi(m,n)$ is partitioned into N time slots 1, ..., p, ..., N,
(ii) time slot p of the waveform $\phi(m,n)$ comprises a basic waveform $b(m)$ multiplied by $\exp[2\pi(n-1)(p-1)i/N]$,
(iii) the first waveform $\phi(M,1)$ is multiplied by the first data item $d(M,1)$, and the second waveform $\phi(1,N)$ is multiplied by the second data item $d(1,N)$,
(iv) M and N are positive integers greater than 1,
(v) m is a positive integer in the range $m\epsilon\{1, ..., M\}$, and
(vi) n and p are positive integers in the range $n\epsilon\{1, ..., N\}$;

receiving, from the radio channel during the frame, a third modulated radio-frequency carrier signal via an antenna;
demodulating the third modulated radio-frequency carrier signal to recover the first data item $d(M,1)$ and the second data item $d(1,N)$; and
transmitting the first data item $d(M,1)$ in association with the first wireless terminal and the second data item $d(1,N)$ in association with the second wireless terminal.

17. The process of claim 16 wherein j and k are positive integers in the range $m\epsilon\{1, ..., M\}$, and
wherein a basic waveform $b(j)$ and a basic waveform $b(k)$ are orthogonal for $j \neq k$.

18. The process of claim 16 wherein the basic waveform $b(m)$ is waveform m in an M-ary stepped-pulse waveform scheme.

19. The process of claim 16 wherein the bandwidth of the radio channel is B Hz, and the duration of the basic waveform b(m) is M/B seconds.

20. The process of claim 16 wherein the bandwidth of the radio channel is B Hz, and the duration of the waveform φ(m,n) is M·N/B seconds.

21. A process comprising:
receiving at a first wireless terminal a first command to transmit a first modulated radio-frequency carrier signal into a radio channel during a frame, wherein the first modulated radio-frequency carrier signal is modulated with a first waveform φ(1,1) and a first data item d(1,1), and wherein:
  (i) the waveform φ(m,n) is partitioned into N time slots 1, ..., p, ..., N,
  (ii) time slot p of the waveform φ(m,n) comprises a basic waveform b(m) multiplied by exp[2π(n−1)(p−1)i/N],
  (iii) the first waveform φ(1,1) is multiplied by the first data item d(1,1),
  (iv) M and N are positive integers greater than 1,
  (v) m is a positive integer in the range m∈{1, ..., M}, and
  (vi) n and p are positive integers in the range n∈{1, ..., N};
receiving at a second wireless terminal a second command to transmit a second modulated radio-frequency carrier signal into the radio channel during the frame, wherein the second modulated radio-frequency carrier signal is modulated with a second waveform φ(M,N) and a second data item d(M,N);
modulating at the first wireless terminal a first radio-frequency carrier signal with the first waveform φ(1,1) and the first data item d(1,1) to generate the first modulated radio-frequency carrier signal;
modulating at the second wireless terminal a second radio-frequency carrier signal with the second waveform φ(M,N) and the second data item d(M,N) to generate the second modulated radio-frequency carrier signal;
radiating the first modulated radio-frequency carrier signal into the radio channel during the frame via a first antenna; and
radiating the second modulated radio-frequency carrier signal into the radio channel during the frame via a second antenna.

22. The process of claim 21 wherein j and k are positive integers in the range m∈{1, ..., M}, and
wherein a basic waveform b(j) and a basic waveform b(k) are orthogonal for j≠k.

23. The process of claim 21 wherein the basic waveform b(m) is waveform m in an M-ary stepped-pulse waveform scheme.

24. The process of claim 21 wherein the bandwidth of the radio channel is B Hz, and the duration of the basic waveform b(m) is M/B seconds.

25. The process of claim 21 wherein the bandwidth of the radio channel is B Hz, and the duration of the waveform φ(m,n) is M·N/B seconds.

26. A process comprising:
receiving at a first wireless terminal a first command to transmit a first modulated radio-frequency carrier signal into a radio channel during a frame, wherein the first modulated radio-frequency carrier signal is modulated with a first waveform φ(M,1) and a first data item d(M,1), and wherein:
  (i) the waveform φ(m,n) is partitioned into N time slots 1, ..., p, ..., N,
  (ii) time slot p of the waveform φ(m,n) comprises a basic waveform b(m) multiplied by exp[2π(n−1)(p−1)i/N],
  (iii) the first waveform φ(M,1) is multiplied by the first data item d(M,1),
  (iv) M and N are positive integers greater than 1,
  (v) m is a positive integer in the range m∈{1, ..., M}, and
  (vi) n and p are positive integers in the range n∈{1, ..., N};
receiving at a second wireless terminal a second command to transmit a second modulated radio-frequency carrier signal into the radio channel during the frame, wherein the second modulated radio-frequency carrier signal is modulated with a second waveform φ(1,N) and a second data item d(1,N);
modulating at the first wireless terminal a first radio-frequency carrier signal with the first waveform φ(M,1) and the first data item d(M,1) to generate the first modulated radio-frequency carrier signal;
modulating at the second wireless terminal a second radio-frequency carrier signal with the second waveform φ(1,N) and the second data item d(1,N) to generate the second modulated radio-frequency carrier signal;
radiating the first modulated radio-frequency carrier signal into the radio channel during the frame via a first antenna; and
radiating the second modulated radio-frequency carrier signal into the radio channel during the frame via a second antenna.

27. The process of claim 26 wherein j and k are positive integers in the range m∈{1, ..., M}, and
wherein a basic waveform b(j) and a basic waveform b(k) are orthogonal for j≠k.

28. The process of claim 26 wherein the basic waveform b(m) is waveform m in an M-ary stepped-pulse waveform scheme.

29. The process of claim 26 wherein the bandwidth of the radio channel is B Hz, and the duration of the basic waveform b(m) is M/B seconds.

30. The process of claim 26 wherein the bandwidth of the radio channel is B Hz, and the duration of the waveform φ(m,n) is M·N/B seconds.

* * * * *